United States Patent
Kono et al.

(10) Patent No.: US 11,221,903 B2
(45) Date of Patent: Jan. 11, 2022

(54) MAINTENANCE MANAGEMENT SYSTEM AND MAINTENANCE MANAGEMENT CONFIRMATION DEVICE USED FOR THE SAME

(71) Applicant: HITACHI, LTD., Tokyo (JP)

(72) Inventors: Toshiaki Kono, Tokyo (JP); Takayuki Uchida, Tokyo (JP); Hideaki Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 204 days.

(21) Appl. No.: 16/473,680

(22) PCT Filed: Dec. 8, 2017

(86) PCT No.: PCT/JP2017/044117
§ 371 (c)(1),
(2) Date: Jun. 26, 2019

(87) PCT Pub. No.: WO2018/135171
PCT Pub. Date: Jul. 26, 2018

(65) Prior Publication Data
US 2019/0332462 A1    Oct. 31, 2019

(30) Foreign Application Priority Data

Jan. 19, 2017    (JP) .............................. JP2017-007357

(51) Int. Cl.
*G06F 11/00*    (2006.01)
*G06F 11/07*    (2006.01)
(Continued)

(52) U.S. Cl.
CPC ........ *G06F 11/0787* (2013.01); *G06F 11/079* (2013.01); *G06F 11/0778* (2013.01); *G06F 16/9035* (2019.01); *G07C 1/10* (2013.01)

(58) Field of Classification Search
None
See application file for complete search history.

(56) References Cited

U.S. PATENT DOCUMENTS

| 8,504,874 | B2 * | 8/2013 | Goldszmidt | ........ G06F 11/0793 |
| | | | | 714/25 |
| 2007/0294090 | A1 * | 12/2007 | Thieret | .............. G05B 23/0248 |
| | | | | 705/305 |

(Continued)

FOREIGN PATENT DOCUMENTS

| JP | 2002-150423 A | 5/2002 |
| JP | 2002-269265 A | 9/2002 |

(Continued)

OTHER PUBLICATIONS

Google Scholar/Patents—text refined (Year: 2021).*
International Search Report of PCT/JP2017/044117 dated Feb. 6, 2018.

*Primary Examiner* — Christopher S McCarthy
(74) *Attorney, Agent, or Firm* — Mattingly & Malur, PC

(57) ABSTRACT

A maintenance management system includes: a failure information DB that stores at least a failure mode for each of diagnosis target assets; an automatic diagnosis definition DB that stores diagnostic criteria for diagnosing failure modes of the diagnosis target assets; an automatic diagnosis unit that detects or predicts occurrence of a failure mode of a diagnosis target asset, based on a measurement value representing a state of the diagnosis target asset measured by a sensor and the diagnostic criteria; a maintenance method DB that stores in advance a maintenance method corresponding to a failure mode; an automatic diagnosis result log storage unit that records at least a diagnosis result by the automatic diagnosis unit and information regarding an alarm issued; and a maintenance work log storage unit that records at least (Continued)

a maintenance work content performed on the diagnosis target asset and includes a task performance analysis unit.

4 Claims, 15 Drawing Sheets

(51) Int. Cl.
  *G06F 16/9035* (2019.01)
  *G07C 1/10* (2006.01)

(56) References Cited

U.S. PATENT DOCUMENTS

| | | | |
|---|---|---|---|
| 2009/0106327 A1* | 4/2009 | Dilman | G06F 11/0793 |
| 2013/0218522 A1 | 8/2013 | Suzuki et al. | |
| 2016/0153806 A1* | 6/2016 | Ciasulli | H04L 45/22 |
| | | | 702/184 |
| 2017/0060659 A1* | 3/2017 | Lee | G06Q 40/025 |

FOREIGN PATENT DOCUMENTS

| | | |
|---|---|---|
| JP | 2004-020477 A | 1/2004 |
| JP | 2008-004091 A | 1/2008 |
| JP | 2012-094044 A | 5/2012 |

* cited by examiner

FIG. 2

| TARGET ASSET | | TIME | MONITORING DATA | |
|---|---|---|---|---|
| TARGET VEHICLE | TARGET COMPONENT | | TYPE | MEASUREMENT VALUE |
| VEHICLE NUMBER 1 | BEARING 1 | 2016/10/03 08:00 | VIBRATION INTENSITY (NORMALIZED) | 1.05 |
| VEHICLE NUMBER 1 | BEARING 1 | 2016/10/03 09:00 | VIBRATION INTENSITY (NORMALIZED) | 1.18 |
| VEHICLE NUMBER 1 | BEARING 1 | 2016/10/03 10:00 | VIBRATION INTENSITY (NORMALIZED) | 1.09 |
| VEHICLE NUMBER 1 | BEARING 1 | 2016/10/03 11:00 | VIBRATION INTENSITY (NORMALIZED) | 1.11 |
| VEHICLE NUMBER 1 | BEARING 1 | 2016/10/03 12:00 | VIBRATION INTENSITY (NORMALIZED) | 1.11 |
| VEHICLE NUMBER 1 | BEARING 2 | 2016/10/03 12:00 | VIBRATION INTENSITY (NORMALIZED) | 1.01 |
| VEHICLE NUMBER 1 | BEARING 2 | 2016/10/03 13:00 | VIBRATION INTENSITY (NORMALIZED) | 1.00 |
| VEHICLE NUMBER 1 | BEARING 2 | 2016/10/03 14:00 | VIBRATION INTENSITY (NORMALIZED) | 1.03 |
| VEHICLE NUMBER 1 | BEARING 2 | 2016/10/10 14:00 | VIBRATION INTENSITY (NORMALIZED) | 1.01 |
| VEHICLE NUMBER 1 | BEARING 2 | 2016/10/10 15:00 | VIBRATION INTENSITY (NORMALIZED) | 1.08 |
| VEHICLE NUMBER 1 | BEARING 2 | 2016/10/10 16:00 | VIBRATION INTENSITY (NORMALIZED) | 1.20 |
| VEHICLE NUMBER 1 | BEARING 2 | 2016/10/10 17:00 | VIBRATION INTENSITY (NORMALIZED) | 1.18 |
| VEHICLE NUMBER 1 | BEARING 2 | 2016/10/10 18:00 | VIBRATION INTENSITY (NORMALIZED) | 1.25 |
| VEHICLE NUMBER 3 | BEARING 10 | 2016/10/08 15:00 | VIBRATION INTENSITY (NORMALIZED) | 1.01 |
| VEHICLE NUMBER 3 | BEARING 10 | 2016/10/08 16:00 | VIBRATION INTENSITY (NORMALIZED) | 1.30 |
| VEHICLE NUMBER 4 | BEARING 1 | 2016/10/03 12:00 | TEMPERATURE | 80 DEGREES |
| VEHICLE NUMBER 4 | BEARING 1 | 2016/10/03 12:01 | TEMPERATURE | 110 DEGREES |
| VEHICLE NUMBER 2 | DOOR 1 | 2016/10/03 10:15 | DOOR OPENING TIME | 5.0 SECONDS |
| VEHICLE NUMBER 2 | DOOR 1 | 2016/10/03 10:23 | DOOR OPENING TIME | 4.9 SECONDS |
| VEHICLE NUMBER 2 | DOOR 1 | 2016/10/03 11:00 | DOOR OPENING TIME | 5.5 SECONDS |
| VEHICLE NUMBER 2 | DOOR 1 | 2016/10/03 11:08 | DOOR OPENING TIME | 5.6 SECONDS |
| VEHICLE NUMBER 2 | DOOR 1 | 2016/10/03 11:18 | DOOR OPENING TIME | 5.7 SECONDS |
| VEHICLE NUMBER 2 | DOOR 1 | 2016/10/03 12:05 | DOOR OPENING TIME | 5.6 SECONDS |
| VEHICLE NUMBER 2 | DOOR 1 | 2016/10/03 10:15 | DOOR CLOSING TIME | 5.0 SECONDS |
| VEHICLE NUMBER 2 | DOOR 1 | 2016/10/03 10:23 | DOOR CLOSING TIME | 4.9 SECONDS |
| VEHICLE NUMBER 2 | DOOR 1 | 2016/10/03 11:00 | DOOR CLOSING TIME | 5.1 SECONDS |
| VEHICLE NUMBER 2 | DOOR 1 | 2016/10/03 11:08 | DOOR CLOSING TIME | 5.0 SECONDS |
| VEHICLE NUMBER 2 | DOOR 1 | 2016/10/03 11:18 | DOOR CLOSING TIME | 5.1 SECONDS |
| VEHICLE NUMBER 2 | DOOR 1 | 2016/10/03 12:05 | DOOR CLOSING TIME | 5.1 SECONDS |
| VEHICLE NUMBER 2 | DOOR 1 | 2016/10/03 10:15 | DOOR AIR PRESSURE | 3.0bar |
| VEHICLE NUMBER 2 | DOOR 1 | 2016/10/03 10:23 | DOOR AIR PRESSURE | 3.0bar |
| VEHICLE NUMBER 2 | DOOR 1 | 2016/10/03 11:00 | DOOR AIR PRESSURE | 3.1bar |
| VEHICLE NUMBER 2 | DOOR 1 | 2016/10/03 11:08 | DOOR AIR PRESSURE | 3.1bar |
| VEHICLE NUMBER 2 | DOOR 1 | 2016/10/03 11:18 | DOOR AIR PRESSURE | 3.0bar |
| VEHICLE NUMBER 2 | DOOR 1 | 2016/10/03 12:05 | DOOR AIR PRESSURE | 3.0bar |

FIG. 3

| TARGET COMPONENT | | FAILURE ID | FAILURE MODE | SYMPTOM | CAUSE |
|---|---|---|---|---|---|
| COMPONENT | SUPERORDINATE COMPONENT | | | | |
| BEARING 1 | CARRIAGE 1 | 1 | DAMAGE IN BEARING | VIBRATION, HEAT GENERATION, FIXATION | FOREIGN MATTER, OUT OF GREASE, SHOCK |
| BEARING 1 | CARRIAGE 1 | 2 | DAMAGE IN BEARING (LARGE) | HEAT GENERATION, FIXATION | EXPANSION OF DAMAGE IN BEARING |
| BEARING 2 | CARRIAGE 1 | 11 | DAMAGE IN BEARING | VIBRATION, HEAT GENERATION, FIXATION | FOREIGN MATTER, OUT OF GREASE, SHOCK |
| BEARING 10 | CARRIAGE 3 | 21 | DAMAGE IN BEARING | VIBRATION, HEAT GENERATION, FIXATION | FOREIGN MATTER, OUT OF GREASE, SHOCK |
| ... | ... | ... | ... | ... | ... |
| CARRIAGE 1 | PASSENGER CAR 1 | 31 | BEARING ABNORMALITY | WHEEL ROTATION ABNORMALITY | BEARING ABNORMALITY, BEARING FIXING ABNORMALITY |
| CARRIAGE 2 | PASSENGER CAR 1 | 32 | BEARING ABNORMALITY | WHEEL ROTATION ABNORMALITY | BEARING ABNORMALITY, BEARING FIXING ABNORMALITY |
| CARRIAGE 3 | PASSENGER CAR 2 | 33 | BEARING ABNORMALITY | WHEEL ROTATION ABNORMALITY | BEARING ABNORMALITY, BEARING FIXING ABNORMALITY |
| ... | ... | ... | ... | ... | |
| PASSENGER CAR 1 | ORGANIZATION | 41 | CARRIAGE ABNORMALITY | HINDRANCE IN TRAVELING | |
| PASSENGER CAR 2 | ORGANIZATION | 42 | CARRIAGE ABNORMALITY | HINDRANCE IN TRAVELING | |
| ... | | ... | ... | ... | |
| DOOR 1 | PASSENGER CAR 1 | 101 | DOOR OPENING SPEED DECREASE | DOOR OPENING TIME IS LONG | DOOR RAIL DUST, DOOR PLATE DEFORMATION, AIR PRESSURE DECREASE |
| | | 102 | DOOR CLOSING SPEED DECREASE | DOOR CLOSING TIME IS LONG | DOOR RAIL DUST, DOOR PLATE DEFORMATION, AIR PRESSURE DECREASE |
| DOOR RAIL 1 | DOOR 1 | 111 | DOOR RAIL RESISTANCE INCREASE | DOOR OPENING/CLOSING SPEED DECREASE, FIXATION | POOR CLEANING, PASSENGER |
| DOOR PLATE 1 | DOOR 1 | 121 | DOOR PLATE DEFORMATION | DOOR OPENING/CLOSING SPEED DECREASE, FIXATION | COLLISION, PASSENGER |
| DOOR AIR PRESSURE SYSTEM 1 | DOOR 1 | 131 | AIR PRESSURE DECREASE | DOOR OPENING/CLOSING SPEED DECREASE, FIXATION | AIR LEAK, COMPRESSOR ABNORMALITY |
| ... | | | | | |
| TOILET 1 | PASSENGER CAR 1 | 200 | TOILET CLOGGING | NOT FLUSH | FOREIGN MATTER MIXING |
| ... | | ... | ... | ... | ... |

FIG. 4

| AUTOMATIC DIAGNOSIS ID | TARGET ASSET | DIAGNOSIS TYPE | DIAGNOSTIC CRITERIA | MAINTENANCE REQUEST | FAILURE ID |
|---|---|---|---|---|---|
| 1 | BEARING 1 | BEARING ABNORMAL VIBRATION | WHEN VIBRATION INTENSITY (NORMALIZED) V SATISFIES V>=1.10, ALARM IS ISSUED | PART REPLACEMENT WITHIN 10 DAYS | 1 |
| 2 | BEARING 2 | BEARING ABNORMAL VIBRATION | WHEN VIBRATION INTENSITY (NORMALIZED) V SATISFIES V>=1.10, ALARM IS ISSUED | PART REPLACEMENT WITHIN 10 DAYS | 11 |
| 3 | BEARING 10 | BEARING ABNORMAL VIBRATION | WHEN VIBRATION INTENSITY (NORMALIZED) V SATISFIES V>=1.10, ALARM IS ISSUED | PART REPLACEMENT WITHIN 10 DAYS | 21 |
| 4 | DOOR | DOOR OPENING TIME ABNORMALITY | WHEN DOOR OPENING TIME DOT SATISFIES DOT>=5.5 sec, ALARM IS ISSUED | PART REPLACEMENT WITHIN 15 DAYS | 101 |
| 5 | DOOR RAIL | DOOR RAIL RESISTANCE INCREASE | WHEN DOOR OPENING TIME DOT SATISFIES DOT>=5.2 sec, DOOR CLOSING TIME DCT SATISFIES DCT>=5.2 sec, AND DOOR AIR PRESSURE DPS SATISFIES DPS>=3.0 bar, ALARM IS ISSUED | CLEANING AND LUBRICATION WITHIN 15 DAYS | 111 |
| 6 | BEARING 1 | BEARING HEAT GENERATION | WHEN BEARING TEMPERATURE Tm IS HIGHER THAN OR EQUAL TO 100 DEGREES | IMMEDIATE PART REPLACEMENT | 1 |

FIG. 6

| TASK ID | PROBLEM | TARGET ASSET | | WORK INSTRUCTION | | | | |
|---|---|---|---|---|---|---|---|---|
| | | TARGET VEHICLE | TARGET COMPONENT | FAILURE ID | DIAGNOSIS INFORMATION SOURCE | WORK REQUEST CONTENT | REQUEST DATE | SCHEDULED WORK DATE |
| 1 | DOOR OPENING ABNORMALITY | VEHICLE NUMBER 2 | DOOR 1 | 10 | NA | DOOR OPENING ABNORMALITY CAUSE EXAMINATION AND REPAIR | 2016/9/30 | 2016/10/11 |
| 2 | TOILET CLOGGING | VEHICLE NUMBER 1 | TOILET 2 | 200 | WORKER | CLEANING AND INSPECTION | 2016/10/1 | 2016/10/10 |
| 3 | BEARING ABNORMALITY | VEHICLE NUMBER 1 | BEARING 1 | 1 | NA | BEARING REPLACEMENT | 2016/10/3 | 2016/10/10 |
| 4 | BEARING ABNORMALITY | VEHICLE NUMBER 3 | BEARING 10 | 1 | ALARM ID 4 | BEARING REPLACEMENT | 2016/10/8 | 2016/10/10 |
| 5 | BEARING ABNORMALITY | VEHICLE NUMBER 1 | BEARING 2 | 1 | NA | BEARING REPLACEMENT | 2016/10/10 | 2016/10/30 |
| 6 | BEARING FIXATION AND CARRIAGE BREAKAGE | VEHICLE NUMBER 4 | BEARING 4 | 2 | ALARM ID 6 | BEARING AND PERIPHERAL PART REPLACEMENT | 2016/10/3 | 2016/10/10 |

| TASK ID | INSPECTION | | OPERATION | | MAINTENANCE METHOD ID | WORK CONTENT | TREATMENT | | | IMPLEMENTATION DATE AND TIME | WORK TIME [MINUTES] |
|---|---|---|---|---|---|---|---|---|---|---|---|
| | INSPECTION RESULT | FAILURE ID | PRESENCE OR ABSENCE OF INFLUENCE | OPERATION STOP TIME | | | TARGET VEHICLE | TARGET ASSET | TARGET COMPONENT | | |
| 1 | DOOR RAIL IS VISUALLY INSPECTED. DUST IN RAIL IS FOUND. AIR PRESSURE IS NORMAL. NO OTHER ABNORMALITIES | 111 | NONE | 2016/10/01 07:00 | 1111 | CLEANING | VEHICLE NUMBER 2 | DOOR 1 | | 2016/10/11 13:00 | 30 |
| 2 | CLOGGING PLACE IS IDENTIFIED | 200 | TOILET IS UNUSABLE | NONE | 2001 | CLEANING | VEHICLE NUMBER 1 | TOILET 2 | | 2016/10/10 15:00 | 40 |
| 3 | BEARING VIBRATION IS CONFIRMED | 1 | NONE | NONE | 1000 | PART REPLACEMENT | VEHICLE NUMBER 1 | BEARING 1 | | 2016/10/10 16:00 | 200 |
| 4 | BEARING VIBRATION IS CONFIRMED | 21 | NONE | NONE | 1021 | PART REPLACEMENT | VEHICLE NUMBER 3 | BEARING 10 | | 2016/10/10 20:00 | 150 |
| 5 | BEARING VIBRATION IS CONFIRMED | 11 | NONE | NONE | 1011 | PART REPLACEMENT | VEHICLE NUMBER 1 | BEARING 2 | | 216/10/30 09:00 | 150 |
| 6 | DESTRUCTION OF BEARING AND PERIPHERAL PARTS IS CONFIRMED | 2 | OPERATION IS IMPOSSIBLE | 2016/10/03 12:02 | 1001 | PART REPLACEMENT | VEHICLE NUMBER 4 | CARRIAGE 1 | | 2016/10/10 21:00 | 500 |

| MAINTENANCE METHOD ID | FAILURE ID | INSPECTION METHOD | TREATMENT METHOD |
|---|---|---|---|
| 1000 | 1 | VIBRATION INTENSITY CONFIRMATION BY SENSOR | PART REPLACEMENT |
| 1001 | 2 | CHECK OF HEAT GENERATION, VIBRATION INTENSITY CONFIRMATION | PART REPLACEMENT. PERIPHERAL PART REPLACEMENT AS NECESSARY |
| 1011 | 11 | VIBRATION INTENSITY CONFIRMATION BY SENSOR | PART REPLACEMENT |
| 1021 | 21 | VIBRATION INTENSITY CONFIRMATION BY SENSOR | PART REPLACEMENT |
| ⋮ | ⋮ | ⋮ | ⋮ |
| 1101 | 101 | DOOR OPENING TIME MEASUREMENT | RAIL, PRESSURE INSPECTION |
| 1102 | 102 | DOOR CLOSING TIME MEASUREMENT | RAIL, PRESSURE INSPECTION |
| 1111 | 111 | VISUAL INSPECTION IN RAIL | CLEANING AND LUBRICATION |
| 1121 | 121 | DOOR VISUAL INSPECTION | PART REPLACEMENT |
| 1131 | 131 | AIR PRESSURE MEASUREMENT, AIR LEAK MEASUREMENT | PART REPLACEMENT |
| ⋮ | ⋮ | ⋮ | ⋮ |
| 2001 | 200 | VISUAL OR DISASSEMBLY INSPECTION FROM ABOVE | CLOGGING REMOVAL |
| ⋮ | ⋮ | ⋮ | ⋮ |

FIG. 12

| MAINTENANCE WORK LOG TASK ID | DIAGNOSIS INFORMATION SOURCE | AUTOMATIC DIAGNOSIS RESULT LOG ALARM ID | MATCHING DEGREE M | ISSUING TIME |
|---|---|---|---|---|
| 1 | NA | 3 | 0.33 | 2016/10/03 09:00 |
| 2 | WORKER | NONE | NONE | NONE |
| 3 | NA | 1 | 1 | 2016/10/03 09:00 |
|   |    | 2 | 1 | 2016/10/03 11:00 |
| 4 | ALARM ID 4 | 4 | 1 | 2016/10/10 16:00 |
| 5 | NA | 5 | 1 | 2016/10/08 11:00 |
| 6 | ALARM ID 6 | 6 | 1 | 2016/10/03 12:01 |

FIG. 13

| FAILURE ID | OPERATION FAULT PREVENTION EFFECT [10,000 YEN] | WORK COST REDUCTION EFFECT [10,000 YEN] |
|---|---|---|
| 1 | 10 | 2 |
| 2 | 500 | 10 |
| 11 | 10 | 2 |
| 21 | 10 | 2 |
| ⋮ | ⋮ | ⋮ |
| 111 | 1 | 1 |
| 121 | 5 | 1 |
| 131 | 1 | 1 |
| ⋮ | ⋮ | ⋮ |
| 200 | 0.5 | 3 |
| ⋮ | ⋮ | ⋮ |

FIG. 15

| MAINTENANCE WORK LOG | ALARM INFORMATION | | | MAINTENANCE COMPANY PROFIT [10,000 YEN] | | | | | |
|---|---|---|---|---|---|---|---|---|---|
| TASK ID | ALARM ID | MATCHING DEGREE M | OPERATION FAULT PREVENTION AMOUNT PO | OPERATION FAULT PREVENTION AVAILABILITY | WORK COST REDUCTION AMOUNT PM | EXPECTED PROFIT PE | PROFIT P | CHARGE AMOUNT C [10,000 YEN] |
| 1 | 3 | 0.33 | 1 | AVAILABLE | 1 | 2 | 0.66 | 0.066 |
| 2 | NONE | NONE | 0.5 | UNAVAILABLE | 3 | 3 | 0 | 0 |
| 3 | 1 | 1 | 10 | AVAILABLE | 2 | 12 | 12 | 1.2 |
| 4 | 4 | 1 | 10 | AVAILABLE | 2 | 12 | 12 | 1.2 |
| 5 | 5 | 1 | 10 | UNAVAILABLE | 2 | 2 | 2 | 0.2 |
| 6 | 6 | 1 | 500 | UNAVAILABLE | 100 | 100 | 100 | 10 |

[CHARGE RATE R = 10%]

FIG. 16

| TASK ID | MAINTENANCE WORK LOG - INSPECTION RESULT | FAILURE ID | ALARM INFORMATION - ALARM ID | ALARM INFORMATION - DIAGNOSIS TYPE | MATCHING DEGREE | CHARGE AMOUNT ESTIMATE - MAINTENANCE COMPANY PROFIT ESTIMATE [10,000 YEN] | CHARGE AMOUNT ESTIMATE - CHARGE AMOUNT [10,000 YEN] | CHARGE AMOUNT DETERMINED VALUE [10,000 YEN] | AGREEMENT |
|---|---|---|---|---|---|---|---|---|---|
| 1 | DOOR RAIL IS VISUALLY INSPECTED. DUST IN RAIL IS FOUND. AIR PRESSURE IS NORMAL, NO OTHER ABNORMALITIES | 111 | 3 | DOOR OPENING TIME ABNORMALITY | 0.33 | 0.66 | 0.066 | 0.066 | ✓ |
| 2 | CLOGGING PLACE IS IDENTIFIED | 200 | NONE | NONE | NONE | 0 | 0 | 0 | ✓ |
| 3 | BEARING VIBRATION IS CONFIRMED | 1 | 1 | BEARING ABNORMAL VIBRATION | 1 | 12 | 1.2 | 1.2 | ✓ |
| 4 | BEARING VIBRATION IS CONFIRMED | 21 | 4 | BEARING ABNORMAL VIBRATION | 1 | 12 | 1.2 | | |
| 5 | BEARING VIBRATION IS CONFIRMED | 11 | 5 | BEARING ABNORMAL VIBRATION | 1 | 2 | 0.2 | 0.3 | ✓ |
| 6 | DESTRUCTION OF BEARING AND PERIPHERAL PART IS CONFIRMED | 2 | 6 | BEARING HEAT GENERATION | 1 | 100 | 10 | 0 | ✓ |

CONFIRMATION

MAINTENANCE MANAGEMENT SYSTEM AND MAINTENANCE MANAGEMENT CONFIRMATION DEVICE USED FOR THE SAME

TECHNICAL FIELD

The present invention relates to a maintenance management system operating in cooperation with an equipment diagnosis system, and more particularly to a maintenance management system including an automatic diagnosis unit that executes automatic diagnosis for equipment targeted for maintenance management, and a maintenance management confirmation device used for the maintenance management system.

BACKGROUND ART

In many fields such as infrastructures, railroads, industrial equipment, and medical equipment, it is necessary to maintain predetermined performance by continuously implementing maintenance after introduction of assets (various types of equipment). In maintenance, a state of a target asset is collected, and diagnosis is applied for analysis of a problem or presence or absence of abnormality, and then appropriate maintenance work is applied.

With recent development of an information technology, it is possible to use a system that automatically performs diagnosis or predictive diagnosis of an asset by collecting a state of the asset with a sensor, and it is possible for a maintenance manager to issue a maintenance work instruction by referring to an alarm issued by an automatic diagnosis unit. Thus, performance of the automatic diagnosis unit has a significant influence on efficiency of maintenance work. When maintenance work is performed on the basis of an appropriate alarm, it becomes possible to shorten work of diagnosis by a worker, or to avoid problems that, influence of a failure has an effect on operation of asset, a loss occurs due to expansion of asset deterioration and destruction, and the like.

When maintenance is constructed using a diagnostic technology based on such an information technology, there are many cases where a maintenance IT company that provides an information system and a maintenance company that actually perform maintenance work are separate organizations. In this case, the maintenance IT company provides a developed information system (diagnosis system) to the maintenance company and receives a charge, and the maintenance company implements maintenance work on the basis of a diagnosis result output by the provided information system (diagnosis system).

In provision of the diagnosis system, it is common for the maintenance IT company to receive a payment from the maintenance company at the time of introduction mainly, and thereafter receive a system maintenance cost and a support cost for operation; however, another form is also conceivable. For example, it is also conceivable that a usage fee for the system is paid to the maintenance IT company from a profit obtained by the maintenance company using the diagnostic technology during operation. In the case of such a form, the maintenance IT company has an incentive to provide a diagnosis system including an automatic diagnosis unit with a higher performance, or an algorithm, so that system performance can be improved, and the maintenance company obtains a profit from that, and an operation state of the asset can be improved eventually.

For example, a technology described in PTL 1 is known as a technology for paying as a usage fee a part of the profit obtained by use of the diagnosis system including the automatic diagnosis unit. PTL 1 discloses that, to make it possible to properly evaluate a value of a failure diagnosis program of a failure diagnosis system, the failure diagnosis program is installed in advance in a failure diagnosis device such as a portable information terminal, gas equipment (for example, a gas water heater) that is equipment targeted for failure diagnosis is made communicable by connection to a communication line or the like, a failure diagnosis menu displayed in accordance with the failure diagnosis program is appropriately selected, and operation responding to a question from the program or corresponding to an instruction from the program is performed on the equipment targeted for failure diagnosis, whereby a failure cause and a failed part can be identified.

Then, it is described that, at regular intervals, from failure diagnosis result data by a conventional failure diagnosis method, and failure diagnosis result data by a failure diagnosis method using the failure diagnosis device, a cost reduction effect is calculated of failure diagnosis by using the failure diagnosis device, that is, how the diagnostic efficiency has been improved, and by multiplication by a predetermined coefficient, charge data is calculated of a failure diagnosis file for each manufacturer and for each gas equipment model.

CITATION LIST

Patent Literature

PTL 1: JP 2002-150423 A

SUMMARY OF INVENTION

Technical Problem

In the case of a failure diagnosis for maintenance in which charging is performed for the profit obtained by the maintenance company, described in PTL 1, it is necessary to detect whether or not a result of automatic diagnosis is used for a maintenance work implementation instruction or an examination by the worker. However, in the configuration of PTL 1, a repair worker creates each failure diagnosis result data at a site or a sales office, and there is no corroboration that it is described that the automatic diagnosis result is used when the failure diagnosis result data is created, and it is also possible to create a report (failure diagnosis result data) in which only an examination result and a work result by the repair worker are described, for example. Thus, in PTL 1, no consideration is given to how to obtain corroboration of using the automatic diagnosis result.

Therefore, the present invention provides a maintenance management system enabled to appropriately detect use of the automatic diagnosis result by the maintenance company, and a maintenance management confirmation device used for the maintenance management system.

Solution to Problem

To solve the above problem, a maintenance management system according to the present invention includes: a failure information database that stores at least a failure mode for each of diagnosis target assets; an automatic diagnosis definition database that stores diagnostic criteria for diagnosing failure modes of the diagnosis target assets; an automatic diagnosis unit that detects or predicts occurrence of a failure mode of each of the diagnosis target assets, based on a measurement value representing a state of each of the diagnosis target assets measured by a sensor and the diagnostic criteria; a maintenance method database that stores in advance a maintenance method corresponding to a failure mode; an automatic diagnosis result log storage unit that records at least a diagnosis result by the automatic diagnosis unit and information regarding an alarm issued; and a maintenance work log storage unit that records at least a maintenance work content performed on each of the diagnosis target assets, and includes a task performance analysis unit that compares a maintenance work content recorded in the maintenance work log storage unit with a maintenance method corresponding to a failure mode of a diagnosis result by the automatic diagnosis unit and stored in the maintenance method database, and detects that an automatic diagnosis result is used for maintenance work.

In addition, a maintenance management confirmation device according to the present invention includes: a failure information database that stores at least a failure mode for each of diagnosis target assets; an automatic diagnosis definition database that stores diagnostic criteria for diagnosing failure modes of the diagnosis target assets; a maintenance method database that stores in advance a maintenance method corresponding to a failure mode; an automatic diagnosis result log storage unit that records at least a diagnosis result by an automatic diagnosis unit and information regarding an alarm issued; and a maintenance work log storage unit that records at least a maintenance work content performed on each of the diagnosis target assets, and includes a task performance analysis unit that compares a maintenance work content recorded in the maintenance work log storage unit with a maintenance method corresponding to a failure mode of a diagnosis result by the automatic diagnosis unit and stored in the maintenance method database, and detects that an automatic diagnosis result is used for maintenance work.

Advantageous Effects of Invention

According to the present invention, it becomes possible to provide the maintenance management system enabled to appropriately detect use of the automatic diagnosis result by the maintenance company, and the maintenance management confirmation device used for the maintenance management system.

The problems, configurations, and effects other than those described above will be clarified from description of embodiments below.

BRIEF DESCRIPTION OF DRAWINGS

FIG. 2 is a diagram illustrating a data structure of a measurement value database illustrated in FIG. 1.

FIG. 3 is a diagram illustrating a data structure of a failure information database constituting a maintenance management confirmation device illustrated in FIG. 1.

FIG. 4 is a diagram illustrating a data structure of an automatic diagnosis definition database constituting the maintenance management confirmation device illustrated in FIG. 1.

FIG. 6 is a diagram illustrating a data structure of a work instruction log storage unit constituting the maintenance management confirmation device illustrated in FIG. 1.

FIG. 8 is a diagram illustrating a data structure of a maintenance work log storage unit constituting the maintenance management confirmation device illustrated in FIG. 1.

FIG. 9 is a diagram illustrating a data structure of a maintenance method database constituting the maintenance management confirmation device illustrated in FIG. 1.

FIG. 12 is a diagram illustrating a matching degree calculation result by the task performance analysis unit constituting the maintenance management confirmation device illustrated in FIG. 1.

FIG. 13 is a diagram illustrating a data structure of a diagnostic charge database constituting a charge processing device illustrated in FIG. 1.

FIG. 15 is a diagram illustrating a charge amount estimation result by the charge amount estimation unit constituting the charge processing device illustrated in FIG. 1.

FIG. 16 is a screen display example of a display device constituting an HMI illustrated in FIG. 1.

DESCRIPTION OF EMBODIMENTS

Hereinafter, an embodiment of the present invention will be described with reference to the drawings.

First Embodiment

Figure 1:
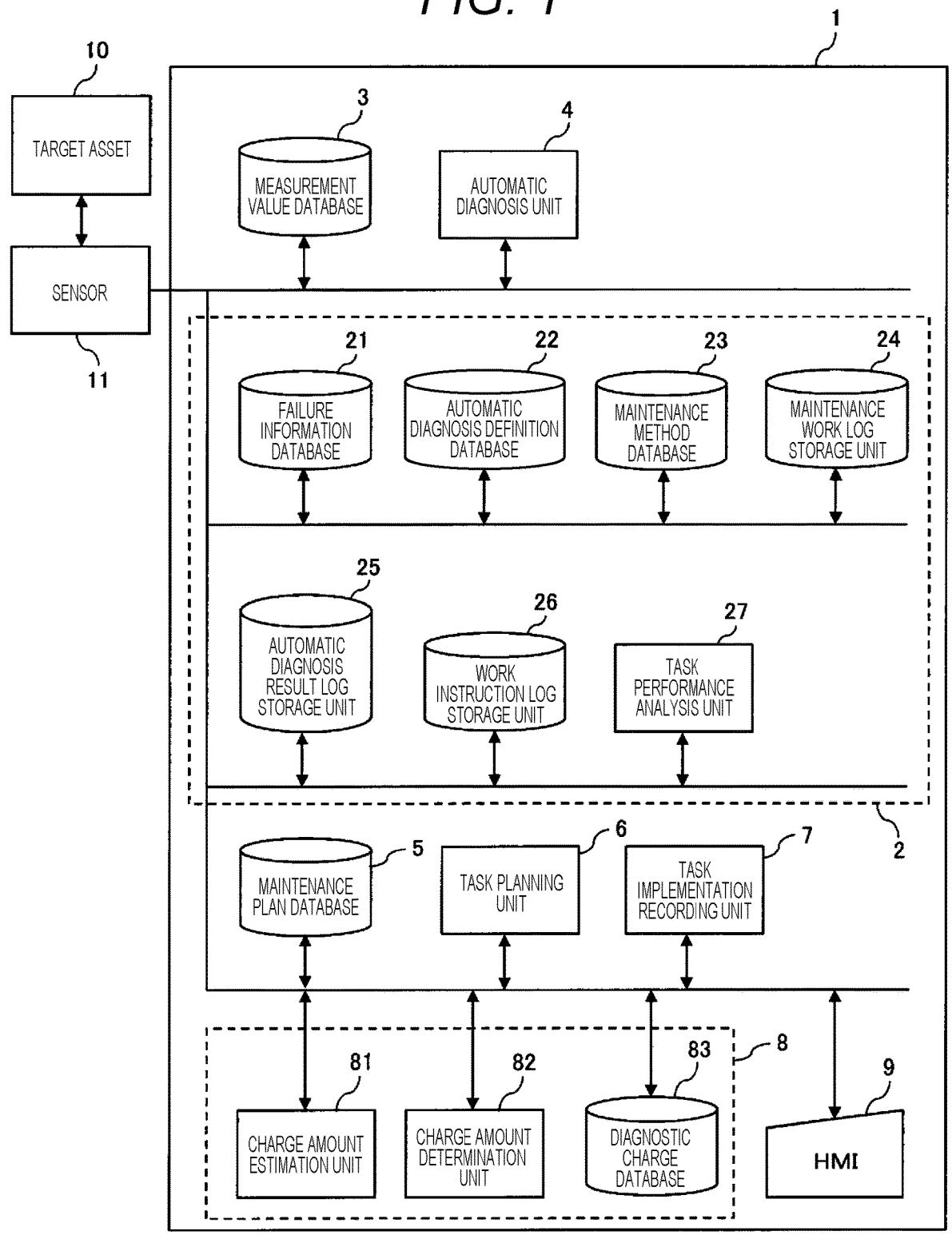
FIG. 1 is an overall schematic configuration diagram of a maintenance management system according to an embodiment of the present invention.

FIG. 1 is an overall schematic configuration diagram of a maintenance management system according to an embodiment of the present invention. As illustrated in FIG. 1, a maintenance management system 1 includes a maintenance management confirmation device 2, a measurement value database 3, an automatic diagnosis unit 4, a maintenance plan database 5, a task planning unit 6, a task implementation recording unit 7, a charge processing device 8, and a human machine interface (HMI) 9, which are accessibly connected to each other via a bus. Note that, the HMI 9 includes: a display device (not illustrated) such as a liquid crystal display (LCD) or an organic EL display; and an input device (not illustrated) such as a keyboard and/or a mouse. Various measurement values measured by a sensor 11 installed in a target asset 10 are input to the maintenance management system 1. In addition, the automatic diagnosis unit 4 is implemented with, for example, a processor (not illustrated) such as a central processing unit (CPU), a ROM (not illustrated) that stores various programs, a RAM (not illustrated) that temporarily stores data in a calculation process, and a storage device (not illustrated) such as an external storage device, and the processor such as the CPU reads and executes the various programs stored in the ROM, and stores a calculation result that is an execution result in the RAM or the external storage device.

The asset 10 and the sensor 11 to which the maintenance management system 1 of the present embodiment is applied are not limited to a specific asset, sensor technology, or analysis technology; however, in the following, bearing monitoring and door monitoring of a railroad vehicle will be described as examples.

(Measurement Value Database)

The measurement value database 3 stores a measurement value representing a state of the target asset 10 measured by the sensor 11. The measurement value is transmitted or transferred from the sensor 11 to the measurement value database 3 by wireless or wired communication, a memory card, a hard disk, or the like. FIG. 2 illustrates a data structure of the measurement value database 3 illustrated in FIG. 1. As illustrated in FIG. 2, the measurement value database 3 stores "time" and "monitoring data" for each "target asset" in association with each other. The "target asset" column is further subdivided into a column of "vehicle number" of the railroad vehicle that is the target asset 10, and a column of "target component" such as a bearing, or a door, and the "monitoring data" column is subdivided into a column of "type" of monitoring data such as vibration intensity (normalized), door opening time, or door closing time, and a column of "measurement value" for each type, and the data are stored in respective columns. Here, the "vibration intensity (normalized)" stored in the "type" column of the "monitoring data" is a value in which a vibration intensity of a bearing of a wheel of the railroad vehicle that is the target asset 10 is normalized by an average vibration intensity (a value when average vibration intensity is "1.0"). In addition, for the "door opening time", a required time for opening operation of the door is calculated from a difference between operation times of a door opening detection sensor and a door closing detection sensor, and is stored in the "measurement value" column. The "door closing time" is similarly calculated from a difference between operation times of the door opening detection sensor and the door closing detection sensor, and is stored in the "measurement value" column. In addition, it is assumed that a pressure of an air pressure for opening/closing the door is also recorded.

In the example illustrated in FIG. 2, it is indicated that, for the "target asset" in which the "vehicle number" is "vehicle number 1" and the "target component" is "bearing 1", the "vibration intensity (normalized)" that is the "type" of the "monitoring data" was measured as "1.05" when the "time" is "2016/10/03 08:00", and one hour after that, at "2016/10/03 09:00", the "vibration intensity (normalized)" was measured as "1.18".

In addition, it is indicated that, for the "target asset" in which the "vehicle number" is "vehicle number 2" and the "target component" is "door 1", the "door opening time" that is the "type" of the "monitoring data" was "5.0 seconds" when the "time" is "2016/10/03 10:15", and 18 minutes after that, at "2016/10/03 10:23" the "door opening time" was "4.9 seconds".

(Failure Information Database)

FIG. 3 is a diagram illustrating a data structure of a failure information database 21 constituting the maintenance management confirmation device 2 illustrated in FIG. 1. As illustrated in FIG. 3, the failure information database 21 stores "failure ID", "failure mode", "symptom", and "cause" for each "target component" in association with each other. The "target component" column is further subdivided into a column of "component" such as the bearing, or the door, and a column of "superordinate component" to indicate a configuration of the component, and the data are stored in respective columns. Here, for the "failure ID", a unique number (numerical value) is set uniquely associated with the "target component", "failure mode", "symptom" and "cause". In addition, information on the configuration of the component consisting of the "component" and the "superordinate component" may be information according to structural expansion based on a physical configuration of a device, or may be information according to functional expansion based on a functional configuration. Note that, a failure mode may be defined for the superordinate component as well in accordance with a function as viewed in a hierarchical level of the superordinate component. A loss at occurrence may be defined only in a subordinate detailed hierarchical level when the loss depends on a detailed failure mode having actually occurred, depending on the failure mode. On the other hand, when a unit of part replacement is large, or an operation loss is defined by a superordinate function due to convenience of operation or a contract, a loss at occurrence of a superordinate component may be defined, and in that case, there may be a case where there is no loss description of a subordinate component.

In the example illustrated in FIG. 3, when the "component" in the "target component" column is "bearing 1", and "carriage 1" is stored in the "superordinate component" column, and "1" is assigned as the "failure ID", "damage in bearing" is stored in the "failure mode" column, "vibration, heat generation, fixation" is stored in the "symptom" column, and "foreign matter, out of grease, shock" is stored in the "cause" column. In addition, in the second row, when the "component" in the "target component" column is "bearing 1", and "carriage 1" is stored in the "superordinate component" column, and "2" is assigned as the "failure ID", "damage in bearing (large)" is stored in the "failure mode" column, "heat, fixation" is stored in the "symptom" column, and "expansion of damage in bearing" is stored in the "cause" column.

In a row in which "carriage 1" that is the superordinate component of "bearing 1" is stored in the "component" column, when "passenger car 1" is stored in the "superordinate component" column, and "31" is assigned as the "failure ID", "bearing abnormality" is stored in the "failure mode" column, "wheel rotation abnormality" is stored in the "symptom" column, and "bearing abnormality, bearing fixing abnormality" is stored in the "cause" column. In addition, in a row in which "passenger car 1" that is the superordinate component of "carriage 1" is stored in the "component" column, when "organization" is stored in the "superordinate component" column, and "41" is assigned as the "failure ID", "carriage abnormality" is stored in the "failure mode" column, and "hindrance in traveling" is stored in the "symptom" column.

Note that, in the present embodiment, a case has been described where the "superordinate component" column is included in the "target component" column; however, this is not a limitation, and the "target component" column may only include the "component" column.

(Automatic Diagnosis Definition Database)

In an automatic diagnosis definition database 22, definitions are stored of alarms that cause maintenance work implementation after state diagnosis of the target asset (target part) is performed on the basis of rules (diagnostic criteria). FIG. 4 illustrates a data structure of the automatic diagnosis definition database 22 constituting the maintenance management confirmation device illustrated in FIG. 1 As illustrated in FIG. 4, the automatic diagnosis definition database 22 stores "automatic diagnosis ID", "target asset", "diagnosis type" indicating a type of diagnosis, "diagnostic criteria" indicating conditions of sensor data for issuing an alarm, "maintenance request" describing appropriate maintenance work based on remaining life prediction and influence prediction at the time of failure occurrence when the diagnostic criteria are satisfied, and "failure ID". Further, it is assumed that, these automatic diagnosis definitions stored in the automatic diagnosis definition database 22 are stored to be linked with the failure information database 21 by the failure ID, that is, made to be a relational database, whereby an asset, part, and failure mode corresponding to a diagnosis are defined.

In the example illustrated in FIG. 4, when the "automatic diagnosis ID" is "1", "bearing 1" is stored in the "target asset" column, "bearing abnormal vibration" is stored in the "diagnosis type" column, "when vibration intensity (normalized) V satisfies V>=1.10, an alarm is issued" is stored as a rule in the "diagnostic criteria" column, "part replacement within 10 days" is stored in the "maintenance request" column, and "1" is stored in the "failure ID" column. Here, "satisfies V>=1.10" stored in the "diagnostic criteria" column indicates that V is greater than or equal to 1.10.

In addition, when the "automatic diagnosis ID" is "2", "bearing 2" is stored in the "target asset" column, "bearing abnormal vibration" is stored in the "diagnosis type" column, "when vibration intensity (normalized) V satisfies V>=1.10, an alarm is issued" is stored in the "diagnostic criteria" column, "part replacement within 10 days" is stored in the "maintenance request" column, and "11" is stored in the "failure ID" column.

In addition, when the "automatic diagnosis ID" is "4", "door" is stored in the "target asset" column, "door opening time abnormality" is stored in the "diagnosis type" column, "when door opening time DOT satisfies DOT>=5.5 sec, an alarm is issued" is stored in the "diagnostic criteria" column, "part replacement within 15 days" is stored in the "maintenance request" column, and "101" is stored in the "failure ID" column.

When the "automatic diagnosis ID" is "5", "door rail" is stored in the "target asset" column, "door rail resistance increase" is stored in the "diagnosis type" column, "when door opening time DOT satisfies DOT>=5.2 sec, door closing time DCT satisfies DCT>=5.2 sec, and door air pressure DPS satisfies DPS>=3.0 bar, an alarm is issued" is stored in the "diagnostic criteria" column, "cleaning and lubrication within 15 days" is stored in the "maintenance request" column, and "111" is stored in the "failure ID" column.

Note that, it is assumed that, when an alarm of a failure mode of a certain target asset is once issued, to prevent that the alarm is continuously issued, a new alarm is not continuously issued unless a state occurs in which the diagnostic criteria (rules) are not satisfied again. However, when the state of the target asset fluctuates around a threshold of issuing, there may be a case where the issuing is repeatedly performed. For such repeated issuing, there is no problem in presence or absence of a mechanism for suppressing the issuing; however, it is desirable to consider the repeated issuing assuming an actual failure phenomenon in which the mechanism for suppressing is not perfect, or a failure itself may occur intermittently. This is because it is reasonable that, it is prevented that charging is performed for each time the alarm is issued on the basis of a measurement value from each sensor as a result of automatic diagnosis of each component constituting the target asset, and automatic diagnosis results regarding a plurality of components constituting the target asset are combined and charged.

As described above, in the present embodiment, in a case where the "automatic diagnosis ID" is "1" for the bearing 1, failure sign detection by a threshold is performed for the vibration intensity (normalized) normalized by the average vibration intensity. That is, when the vibration intensity (normalized) is V, normality is detected in V<1.10, and failure sign occurrence is detected in V>=1.10. Note that, even when a failure sign occurs, the bearing starts to deteriorate but its normal function is maintained, and it is known that no replacement work is necessary for 10 days thereafter, so that "part replacement within 10 days" is stored in the "maintenance request" column. Setting of such diagnostic criteria (rules) is implemented, for example, by creating a model of expansion of deterioration of the bearing by a physical model, an accelerated test, or statistics of actual parts, or by using an engineer's set value. Diagnostic criteria (rules) are similarly set for other parts such as a door or a door rail as other target assets.

(Automatic Diagnosis Unit)

The automatic diagnosis unit 4 accesses via the bus the measurement value database 3 and the automatic diagnosis definition database 22 constituting the maintenance management confirmation device 2, and executes automatic diagnosis on the basis of information stored in the measurement value database 3 and the automatic diagnosis definition database 22. When there is issuing as a result of the automatic diagnosis, the automatic diagnosis unit 4 records, via the bus in the automatic diagnosis result log storage unit 25, an alarm ID for identifying each issuing, an automatic diagnosis ID corresponding to the automatic diagnosis performed stored in the automatic diagnosis definition database 22, identification information of a target asset for which an alarm has been issued, an issuing time, and the like. Note that, the automatic diagnosis unit 4 does not refer to a knowledge information database when executing the automatic diagnosis.

(Automatic Diagnosis Result Log Storage Unit)

Figure 5:
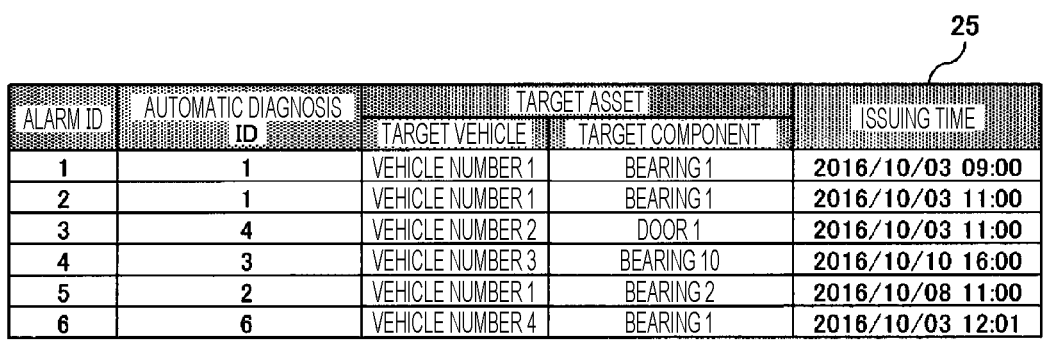
FIG. 5 is a diagram illustrating a data structure of an automatic diagnosis result log storage unit constituting the maintenance management confirmation device illustrated in FIG. 1.

FIG. 5 is a diagram illustrating a data structure of the automatic diagnosis result log storage unit 25 constituting the maintenance management confirmation device 2 illustrated in FIG. 1. As illustrated in FIG. 5, the automatic diagnosis result log storage unit 25 stores "alarm ID", "automatic diagnosis ID", "target asset", and "issuing time". The "target asset" column is further subdivided into a "target vehicle" column and a "target component" column, as identification information of a target asset for which an alarm has been issued. The "alarm ID" is recorded by the automatic diagnosis unit 4 via the bus to identify each issuing. In addition, in the "issuing time", an alarm issuing time is recorded by the automatic diagnosis unit 4 via the bus. The automatic diagnosis unit 4 reads from the measurement value database 3 information on the "automatic diagnosis ID" and "target asset" stored in the automatic diagnosis definition database 22, and the "target vehicle" and "target component" corresponding to the alarm issuing time. The "target vehicle" and "target component" read by the automatic diagnosis unit 4 are each recorded in the automatic diagnosis result log storage unit 25.

In the example illustrated in FIG. 5, when the "alarm ID" is "1", "1" is recorded in the "automatic diagnosis ID" column, "vehicle number 1" is recorded in the "target vehicle" column, "bearing 1" is recorded in the "target component" column, and "2016/10/03 09:00" is recorded in the "issuing time" column.

In addition, when the "alarm ID" is "2", "1" is recorded in the "automatic diagnosis ID" column, "vehicle number 1" is recorded in the "target vehicle" column, "bearing 1" is recorded in the "target component" column, and "2016/10/03 11:00" is recorded in the "issuing time" column.

When the "alarm ID" is "5", "2" is recorded in the "automatic diagnosis ID" column, "vehicle number 1" is recorded in the "target vehicle" column, "bearing 2" is recorded in the "target component" column, and "2016/10/08 11:00" is recorded in the "issuing time" column.

When there is a report of abnormality from an operator or maintenance worker of the target asset, or when contents of the above-described automatic diagnosis result log storage unit 25 are confirmed from a screen display of the display device constituting the HMI 9, a maintenance planner creates a work order by using the task planning unit 6, and requests the maintenance worker to work. Note that, the contents of the automatic diagnosis result log storage unit 25 may be printed out in a tabular format by a printing device (not illustrated) constituting the HMI 9 instead of the screen display of the display device constituting the HMI 9. At this time, the maintenance planner creates an appropriate maintenance work plan by considering a current failure state of the target asset 10 or a failure state predicted in the future, a maintenance available date stored in the maintenance plan database 5, and the maintenance work resource status, and records the plan in a work instruction log storage unit 26, thereby issuing an instruction to the maintenance worker assigned to the work. Note that, the task planning unit 6 is implemented with, for example, a processor (not illustrated) such as a central processing unit (CPU), a ROM (not illustrated) that stores various programs, a RAM (not illustrated) that temporarily stores data in a calculation process, and a storage device (not illustrated) such as an external storage device, and the processor such as the CPU reads and executes the various programs stored in the ROM, and stores a calculation result that is an execution result in the RAM or the external storage device. The work instruction log storage unit 26 and the maintenance plan database 5 will be described below.

(Work Instruction Log Storage Unit and Maintenance Plan Database)

Figure 7:
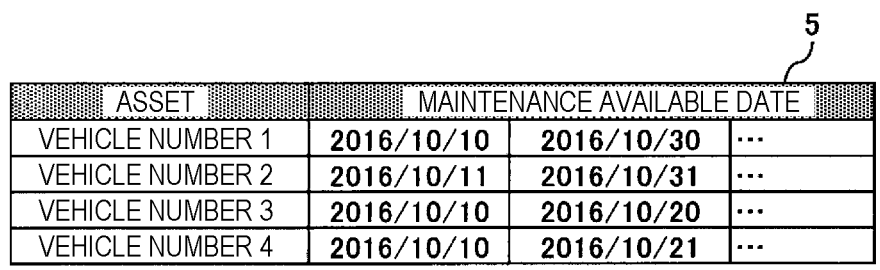
FIG. 7 is a diagram illustrating a data structure of a maintenance plan database illustrated in FIG. 1.

FIG. 6 illustrates a data structure of the work instruction log storage unit constituting the maintenance management confirmation device 2 illustrated in FIG. 1. In addition, FIG. 7 illustrates a data structure of the maintenance plan database 5 illustrated in FIG. 1.

First, whether the work instruction is based on the result of the automatic diagnosis or based on another information source is useful as reference information in the maintenance work implementation, but it is not necessarily essential information, so that it is assumed that the information may or may not be recorded by the maintenance planner. When automatic diagnosis is executed on the target asset 10 by the automatic diagnosis unit 4, it is also conceivable to create an alarm ID automatically or manually on the basis of the result of the automatic diagnosis.

In addition, as seen in the example of the data structure of the automatic diagnosis result log storage unit 25 illustrated in FIG. 5 described above, for an alarm regarding the "target vehicle" of "vehicle number 1" and the "target component" of "bearing 1", an alarm may be recorded multiple times, such as a case where the state of the target asset repeats conformity and nonconformity to the diagnostic criteria (rules) stored in the automatic diagnosis definition database 22 illustrated in FIG. 4. In that case, it is also conceivable that, which alarm ID is to be recorded, or that the content of the abnormality is separately described without recording depends on a rule of the maintenance plan or the discretion of the maintenance planner.

In addition, when the maintenance company is charged due to use of the automatic diagnosis result for the target asset 10 by the automatic diagnosis unit 4, it is also assumed that the maintenance company tries to escape from the charge by intentionally not writing a diagnosis information source, to escape from the charge.

In addition, it is also conceivable that, since the maintenance planner did not refer to the alarm despite an alarm being issued, a work instruction is created on the basis of another information source such as a report of the maintenance worker, so that the work instruction is created without being linked with the alarm.

As illustrated in FIG. 6, the work instruction log storage unit 26 stores "problem", "target asset", "failure ID", "diagnosis information source", "request date" (instruction date), and "scheduled work date" for each "task ID". The "target asset" column is further subdivided into a "target vehicle" column and a "target component" column, as identification information of a target asset for which an alarm has been issued. These "problem", "target vehicle", "target component", "failure ID", "diagnosis information source", "request date" (instruction date), and "scheduled work date" become information regarding a work instruction corresponding to each task ID.

In the example illustrated in FIG. 6, when the "task ID" is "1", "door opening abnormality" is recorded in the "problem" column, "vehicle number 2" is recorded in the "target vehicle" column, "door 1" is recorded in the "target component" column, "10" is recorded in the "failure ID" column, "NA" is recorded in the "diagnosis information source" column, "door opening abnormality cause examination and repair" is recorded in the "work request content" column, "2016/9/30" is recorded in the "request date" (instruction date) column, and "2016/10/11" is recorded in the "scheduled work date" column. Note that, "NA" recorded in the "diagnosis information source" column means No Assign, and means a blank.

When the "task ID" is "2", "toilet" is recorded in the "problem" column, "vehicle number 1" is recorded in the "target vehicle" column, "toilet 2" is recorded in the "target component" column, "200" is recorded in the failure ID" column, "worker" is recorded in the "diagnosis information source" column, "cleaning and inspection" is recorded in the "work request content" column, "2016/10/1" is recorded in the "request date" (instruction date) column, and "2016/10/10" is recorded in the "scheduled work date" column.

In addition, when the "task ID" is "3", "bearing abnormality" is recorded in the "problem" column, "vehicle number 1" is recorded in the "target vehicle" column, "bearing 1" is recorded in the "target component" column, is recorded in the "failure ID" column, "NA" is recorded in the "diagnosis information source" column, "bearing replacement" is recorded in the "work request content" column, "2016/10/3" is recorded in the "request date" (instruction date) column, and "2016/10/10" is recorded in the "scheduled work date" column.

When the "task ID" is "4", "bearing abnormality" is recorded in the "problem" column, "vehicle number 3" is recorded in the "target vehicle" column, "bearing 10" is recorded in the "target component" column, "1" is recorded in the "failure ID" column, "alarm ID 4" is recorded in the "diagnosis information source" column, "bearing replacement" is recorded in the "work request content" column, "2016/10/8" is recorded in the "request date" (instruction date) column, and "2016/10/30" is recorded in the "scheduled work date" column.

When the "task ID" is "1" and "3", "NA" is recorded in the "diagnosis information source" column and there is no description despite an issuing state of an alarm. In addition, when the "task ID" is "2", "worker" is recorded in the "diagnosis information source" column, and when the "task ID" is "4", "alarm ID 4" is recorded in the "diagnosis information source" column, and alarms are described. That is, despite an actual alarm issuing status, there exist a diagnosis information source with the description of the alarm ID and a diagnosis information source without the description of the alarm ID mixedly.

In addition, as illustrated in FIG. 7, in the maintenance plan database 5, a plurality of "maintenance available dates" is stored for each "asset". For example, for the "asset" of "vehicle number 1", "2016/10/10", "2016/10/30", and the like are stored as the "maintenance available dates". In a case where the "task ID" is "3" stored in the work instruction log storage unit 26 illustrated in FIG. 6 described above, the "target vehicle" is "vehicle number 1" and the "request date" (instruction date) is "2016/10/3", so that, among the "maintenance available dates" corresponding to the "vehicle number 1" stored in the maintenance plan database 5, "2016/10/10" that is closest to the "request date" (instruction date) "2016/10/3" is recorded in the "scheduled work date" column.

The maintenance worker refers to the work instruction log storage unit 26, thereby implementing the maintenance work according to the instruction. In the maintenance work, the maintenance worker confirms whether the content of the maintenance instruction is correct by examining the target asset 10. Alternatively, also in a case where a detailed failure mode is not known at a work instruction stage, a failure mode causing the problem is identified by examination.

After the failure mode is confirmed, work is implemented on the basis of a maintenance method stored in a maintenance method database 23 constituting the maintenance management confirmation device 2, which will be described later in detail. After the work, the maintenance worker records an examination result and a content of the implemented work in a maintenance work log storage unit 24 constituting the maintenance management confirmation device 2 by using the task implementation recording unit 7. Note that, the task implementation recording unit 7 is implemented with, for example, a processor (not illustrated) such as a central processing unit (CPU), a ROM (not illustrated) that stores various programs, a RAM (not illustrated) that temporarily stores data in a calculation process, and a storage device (not illustrated) such as an external storage device, and the processor such as the CPU reads and executes the various programs stored in the ROM, and stores a calculation result that is an execution result in the RAM or the external storage device. The maintenance work log storage unit 24 and the maintenance method database 23 will be described below.

(Maintenance Work Log Storage Unit and Maintenance Method Database)

FIG. 8 is a diagram illustrating a data structure of the maintenance work log storage unit 24 constituting the maintenance management confirmation device 2 illustrated in FIG. 1, and FIG. 9 is a diagram illustrating a data structure of the maintenance method database 23 constituting the maintenance management confirmation device 2 illustrated in FIG. 1.

As illustrated in FIG. 9, for each "maintenance method ID", the maintenance method database 23 stores "failure ID", "inspection method" as an inspection and diagnosis method when each failure mode is suspected corresponding to the "failure mode" stored in the failure information database 21 (FIG. 3) associated by the failure ID, and "treatment method" as a maintenance task when a failure mode having occurred is identified.

In the example illustrated in FIG. 9, when the "maintenance method ID" is "1000", "1" is stored in the "failure ID" column, "vibration intensity confirmation by sensor" is stored in the "inspection method" column, and "part replacement" is stored in the "treatment method" column.

In addition, when the "maintenance method ID" is "1001", "2" is stored in the "failure ID" column, "check of heat generation, vibration intensity confirmation" is stored in the "inspection method" column, and "part replacement. peripheral part replacement as necessary" is stored in the "treatment method" column.

When the "maintenance method ID" is "1111", "111" is stored in the "failure ID" column, "visual inspection in rail" is stored in the "inspection method" column, and "cleaning and lubrication" is stored in the "treatment method" column.

In addition, when the "maintenance method ID" is "2001", "200" is stored in the "failure ID" column, "visual or disassembly inspection from above" is stored in the "inspection method" column, and "clogging removal" is stored in the "treatment method" column.

After the work, the maintenance worker records an examination result and a content of the implemented work in the maintenance work log storage unit 24 constituting the maintenance management confirmation device 2 by using the task implementation recording unit 7. As illustrated in FIG. 8, the maintenance work log storage unit 24 stores "inspection", "operation", "maintenance method ID", "treatment", "implementation date and time", and "work time (minutes)", for each "task ID". The "inspection" column is further subdivided into an "inspection result" column and a "failure ID" column, and the "operation" column is further divided into an "presence or absence of influence" column and a column of "operation stop time" that is an operation stop time of the target asset 10, and the "treatment" column is further subdivided into a "work content" column, a "target vehicle" column, and a "target component" column.

In the example illustrated in FIG. 8, when the "task ID" is "1", "door rail is visually inspected. dust in rail is found. no air pressure abnormality" is recorded in the "inspection result" column, "111" is recorded in the "failure ID" column, "none" is recorded in each of the "presence or absence of influence" column and the "operation stop time" column, "1111" is recorded in the "maintenance method ID" column, "cleaning" is recorded in the "work content" column, "vehicle number 2" is recorded in the "target vehicle" column, "door 1" is recorded in the "target component" column, "2016/10/11 13:00" is recorded in the "implementation date and time" column, and "30" is recorded in the "work time (minutes)" column.

In addition, when the "task ID" is "2", "clogging place is identified" is recorded in the "inspection result" column, "200" is recorded in the "failure ID" column, "toilet is unusable" is recorded in the "presence or absence of influence" column, "2016/10/01 07:00" is recorded in the "operation stop time" column, "2001" is recorded in the "maintenance method ID" column, "cleaning" is recorded in the "work content" column, "vehicle number 1" is recorded in the "target vehicle" column, "toilet 2" is recorded in the "target component" column, "2016/10/10 15:00" is recorded in the "implementation date and time" column, and "40" is recorded in the "work time (minutes)" column.

When the "task ID" is "3", "bearing vibration is confirmed" is recorded in the "inspection result" column, is recorded in the "failure ID" column, "none" is recorded in each of the "presence or absence of influence" column and the "operation stop time" column, "1000" is recorded in the "maintenance method ID" column, "part replacement" is recorded in the "work content" column, "vehicle number 1" is recorded in the "target vehicle" column, "bearing 1" is recorded in the "target component" column, "2016/10/10 16:00" is recorded in the "implementation date and time" column, and "200" is recorded in the "work time (minutes)" column.

In addition, when the "task ID" is "6", "destruction of bearing and peripheral part is confirmed" is recorded in the "inspection result" column, "2" is recorded in the "failure ID" column, "operation is impossible" is recorded in the "presence or absence of influence" column, "2016/10/03 12:02" is recorded in the "operation stop time" column, "1001" is recorded in the "maintenance method ID" column, "part replacement" is recorded in the "work content" column, "vehicle number 4" is recorded in the "target vehicle" column, "carriage 1" is recorded in the "target component" column, "2016/10/10 21:00" is recorded in the "implementation date and time" column, and "500" is recorded in the "work time (minutes)" column.

By a series of maintenance processes, implementation is completed of the maintenance work in a case where a problem is found in the target asset 10 due to automatic diagnosis or another information source. Hereinafter, a method will be described for detecting that the maintenance company has used the automatic diagnosis result by the automatic diagnosis unit 4 by the maintenance management confirmation device 2, in such a maintenance process.

(Task Performance Analysis Unit)

Figure 10:
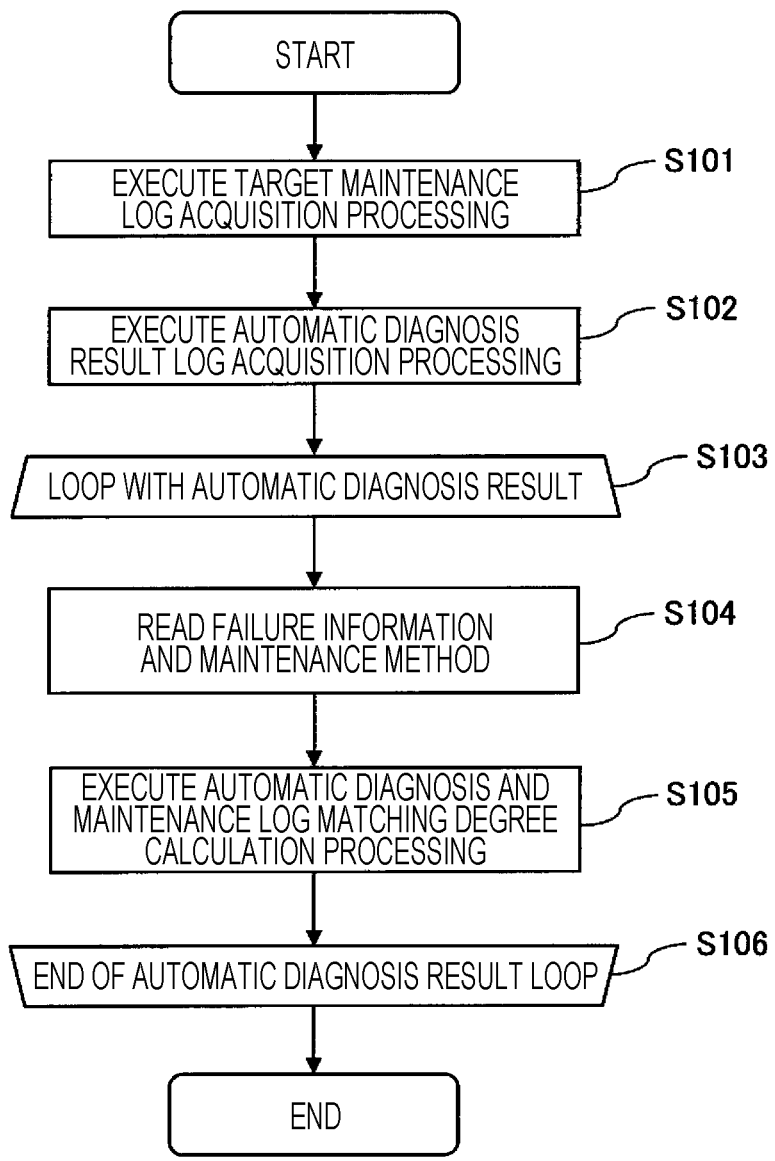
FIG. 10 is a processing flow diagram of a task performance analysis unit constituting the maintenance management confirmation device illustrated in FIG. 1.

FIG. 10 illustrates a processing flow of a task performance analysis unit 27 constituting the maintenance management confirmation device 2 illustrated in FIG. 1. When a maintenance work log is newly recorded in the maintenance work log storage unit 24 constituting the maintenance management confirmation device 2 described above, or at a certain time interval, the task performance analysis unit 27 is activated on the basis of a calendar designated date, or an instruction of the maintenance company or an IT company, and performs processing below. In the following, as an example, a case will be described where the task performance analysis unit 27 starts processing at a timing when the maintenance work log is newly recorded in the maintenance work log storage unit 24 constituting the maintenance management confirmation device described above. Note that, the task performance analysis unit 27 is implemented with, for example, a processor (not illustrated) such as a central processing unit (CPU), a ROM (not illustrated) that stores various programs, a RAM (not illustrated) that temporarily stores data in a calculation process, and a storage device (not illustrated) such as an external storage device, and the processor such as the CPU reads and executes the various programs stored in the ROM, and stores a calculation result that is an execution result in the RAM or the external storage device.

As illustrated in FIG. 10, in step S101, the task performance analysis unit 27 executes target maintenance log acquisition processing. Specifically, the task performance analysis unit 27 accesses via the bus the work instruction log storage unit 26, and reads a work instruction log with the same task ID as a task ID recorded in the maintenance work log storage unit 24 constituting the maintenance management confirmation device 2 by using the task implementation recording unit 7. Here, to facilitate understanding of the description, a case will be described where the "task ID" is "3", as an example. As illustrated in FIG. 6, in the work instruction log in which the "task ID" is "3" read from the work instruction log storage unit 26, it is read as work instruction information that the "problem" is "bearing abnormality", the "target vehicle" is "vehicle number 1", the "target component" is "bearing 1", the "failure ID" is "1", the "diagnosis information source" is "NA", the "work request content" is "bearing replacement", the "request date" (instruction date) is "2016/10/3", and the "scheduled work date" is "2016/10/10".

Next, in step S102, the task performance analysis unit 27 executes automatic diagnosis result log acquisition processing. Specifically, the task performance analysis unit 27 accesses via the bus the automatic diagnosis result log storage unit 25, and reads from the automatic diagnosis result log storage unit 25 an alarm issued for the bearing of the vehicle number 1 that is the target asset 10 within a certain period D before the request date (instruction date: 2016/10/3) acquired from the work instruction log storage unit 26, regarding the bearing 1 of vehicle number 1 that is the target asset 10, as the automatic diagnosis result log. Here, the certain period D is designated by the maintenance planner as a time width, and, for example, 30 days is designated as the certain period D. As a result, for example, in the example illustrated in FIG. 5, at least, as an alarm issued regarding the bearing 1 of the vehicle number 1 that is the target asset 10, it is read that the "alarm ID" is "1" and the "automatic diagnosis ID" is "1", and that the "alarm ID" is "2" and the "automatic diagnosis ID" is "1". Note that, to facilitate understanding of the description, FIG. 5 illustrates a case where the "alarm ID" is from "1" to "6"; however, more "alarm IDs" are stored actually. As described above, since a plurality of automatic diagnosis result logs may be read, thereafter, the logs are processed in the loop as illustrated in steps S103 and S106. In other words, loop processing is performed depending on the automatic diagnosis result by the automatic diagnosis unit 4.

In step S104, the task performance analysis unit 27 executes processing of reading the failure information and maintenance method. Specifically, the task performance analysis unit 27 accesses via the bus the automatic diagnosis definition database 22 (FIG. 4), and extracts the failure ID "1" corresponding to the automatic diagnosis ID "1" out of that the "alarm ID" is "1" and the "automatic diagnosis ID" is "1" read in step S102. Thereafter, the task performance analysis unit 27 accesses the failure information database 21 (FIG. 3), and reads the failure information corresponding to the extracted failure ID "1". Here, the failure information to be read includes the "damage in bearing" as the "failure mode", the "vibration, heat generation, fixation" as the "symptom", and the "foreign matter, out of grease, shock" as the "cause" illustrated in FIG. 3.

In addition, the task performance analysis unit 27 accesses the maintenance method database 23 (FIG. 9), and reads the maintenance method corresponding to the extracted failure ID "1". The maintenance method to be read here includes the "vibration intensity confirmation by sensor" as the "inspection method" and the "part replacement" as the "treatment method" corresponding to the maintenance method ID "1000" illustrated in FIG. 9.

In step S105, the task performance analysis unit 27 executes automatic diagnosis and maintenance log matching degree calculation processing. Specifically, the task performance analysis unit 27 accesses the maintenance work log storage unit 24 (FIG. 8) constituting the maintenance management confirmation device 2, and compares the maintenance work log stored in the log storage unit 24 corresponding to the failure ID "1" extracted in step S104 with the automatic diagnosis result log already acquired, thereby performing calculation of a matching degree M indicating how much the automatic diagnosis result by the automatic diagnosis unit 4 matches the actual failure status that is determined as a result of inspection and recorded in the maintenance work log storage unit 24. A method of calculating the matching degree M can be implemented by, for example, the following elements or a combination thereof. First, when the failure ID linked to the automatic diagnosis ID stored in the automatic diagnosis result log storage unit 25 matches the failure ID recorded in the maintenance work log storage unit 24, the failure has been determined with detailed accuracy, so that the matching degree M is set to M=1. In the case of the present embodiment, as described above, the failure ID linked to the automatic diagnosis ID stored in the automatic diagnosis result log storage unit 25 is "1" (the extracted failure ID "1"), and the failure ID recorded in the maintenance work log storage unit 24 is "1", so that the matching degree M is M=1.

In addition, even when the failure IDs do not match each other, when the automatic diagnosis unit 4 outputs a similar failure, it is possible to give a matching degree. For example, in the present embodiment, as illustrated in FIG. 3, the failure information database 21 stores the "component" and the "superordinate component" as the "target component". That is, since a hierarchical relationship between components is given, the matching degree can be calculated using the relationship.

Figure 11:
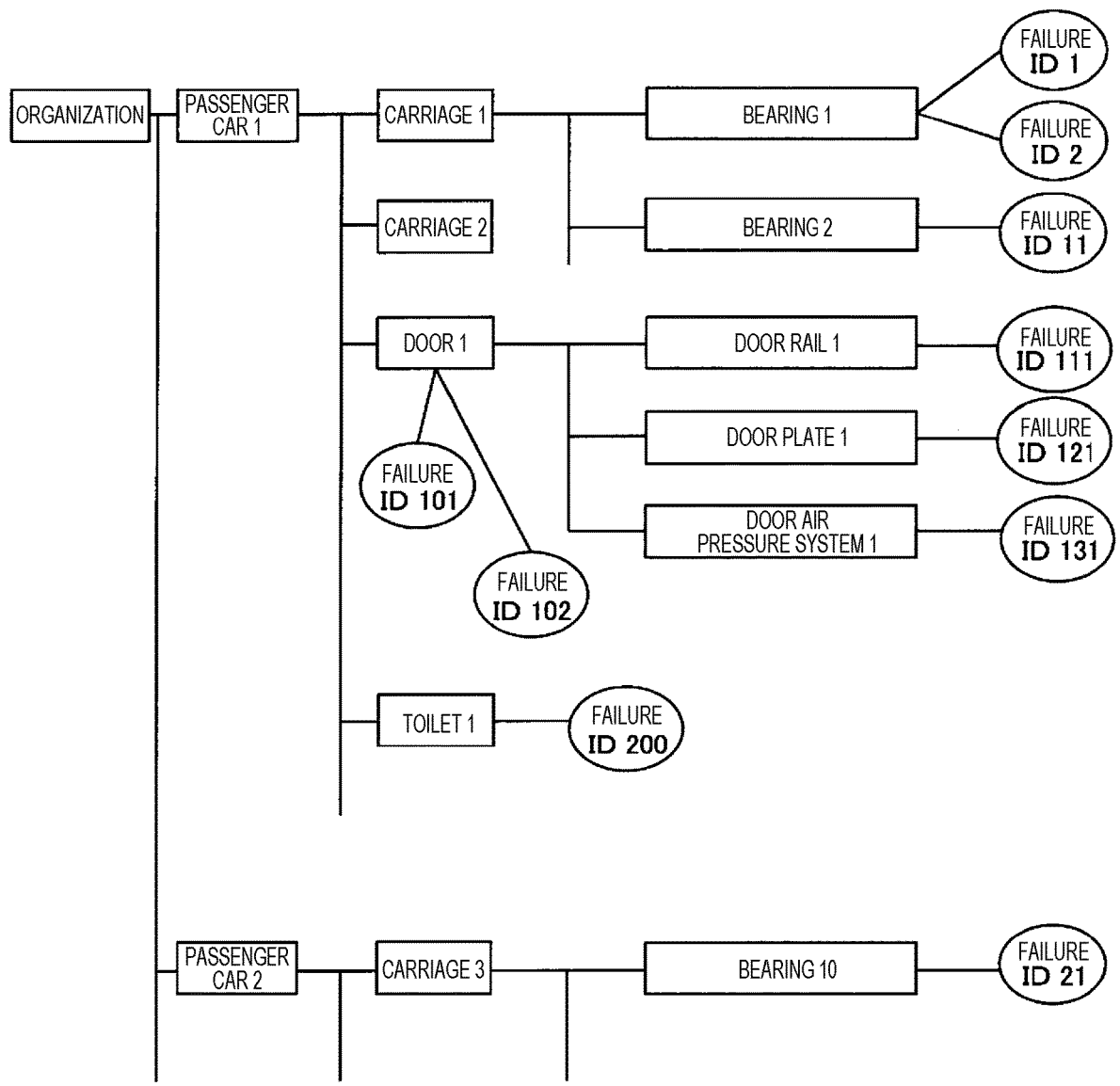
FIG. 11 is a diagram illustrating a hierarchical configuration of target components stored in the failure information database illustrated in FIG. 3.

FIG. 11 is a diagram illustrating a hierarchical configuration of target components stored in the failure information database 21 illustrated in FIG. 3. As illustrated in FIG. 11, the hierarchical configuration of the target components is defined in a network in which components are subdivided by structure with "organization" at the top level, and each failure ID is defined in relation to any component in the network. At this time, as a method of defining the matching degree, a distance L on the network can be defined by the number of components existing between failure IDs in a case where tracing in the shortest distance is performed between the automatic diagnosis results by the automatic diagnosis unit 4, that is, the failure ID linked with the automatic diagnosis ID and the failure recorded in the maintenance work log storage unit 24. For example, when a case is assumed where the failure ID linked to the automatic diagnosis ID is "1" and the failure ID recorded in the maintenance work log storage unit 24 is "2" regarding the bearing 1 illustrated in FIG. 11, only the bearing 1 is a component existing between the failure ID "1" and the failure ID "2", so that the distance L on the network is L=1. In addition, for example, when a case is assumed where the failure ID linked to the automatic diagnosis ID is "1" regarding the bearing 1 and the failure ID regarding the bearing 2 recorded in the maintenance work log storage unit 24 is "11", the components existing between the ID "1" and the failure ID "11" are the bearing 1 and the bearing 2, so that the distance L on the network is L=2. Then, in these cases, for example, the matching degree can be defined as M=1/(L+1). In general, it is sufficient that the matching degree M is M=F (L) using a decreasing function F of the distance L.

In addition, when the distance L on the network is used, M=0 may be set when the distance L is larger than a predetermined value so that the matching degree M is not defined for an alarm to a component far away. In addition, weighting may be performed on connection between the components constituting the network so that the distance L becomes smaller when the components have a high degree of relevance of the failure status or maintenance work, or correction may be performed so that the matching degree M becomes larger in another failure ID related to the same component. When diagnosis in a detailed component is difficult due to imperfection of the sensor 11, even if an alarm is related to failure information defined in the superordinate component, correction can be performed such as increasing the matching degree M.

Next, the processing returns to step S104 again, and the task performance analysis unit 27 accesses via the bus the automatic diagnosis definition database 22 (FIG. 4), and extracts the failure ID "1" corresponding to the automatic diagnosis ID "1" out of that the "alarm ID" is "2" and the "automatic diagnosis ID" is "1" read in step S102. Thereafter, the task performance analysis unit 27 accesses the failure information database 21 (FIG. 3), and reads the failure information corresponding to the extracted failure ID "1". Here, the failure information to be read includes the "damage in bearing" as the "failure mode", the "vibration, heat generation, fixation" as the "symptom", and the "foreign matter, out of grease, shock" as the "cause" illustrated in FIG. 3. In addition, the task performance analysis unit 27 accesses the maintenance method database 23 (FIG. 9), and reads the maintenance method corresponding to the extracted failure ID "1". The maintenance method to be read here includes the "vibration intensity confirmation by sensor" as the "inspection method" and the "part replacement" as the "treatment method" corresponding to the maintenance method ID "1000" illustrated in FIG. 9.

In addition, in step S105, the task performance analysis unit 27 executes the automatic diagnosis and maintenance log matching degree calculation processing. Specifically, the task performance analysis unit 27 accesses the maintenance work log storage unit 24 (FIG. 8) constituting the maintenance management confirmation device 2, and compares the maintenance work log stored in the log storage unit 24 corresponding to the failure ID "1" extracted in step S104 with the automatic diagnosis result log already acquired, thereby performing calculation of a matching degree M indicating how much the automatic diagnosis result by the automatic diagnosis unit 4 matches the actual failure status that is determined as a result of inspection and recorded in the maintenance work log storage unit 24.

The processing for the case where the "task ID" is "3" is completed by the processing up to this point, and the task performance analysis unit 27 outputs the "task ID" of "3" recorded in the maintenance work log storage unit 24 (FIG. 8), the diagnosis information source "NA" corresponding to the task ID "3" recorded in the work instruction log storage unit 26 (FIG. 6), the alarm ID "1" and the alarm issuing time "2016/10/03 09:00", and the alarm ID "2" and the alarm issuing time "2016/10/03 11:00" recorded in the automatic diagnosis result log storage unit 25, and the calculated matching degree M (M=1), to the charge processing device 8 to be described in detail later.

In the present embodiment, to facilitate understanding of the description, only the case where the "task ID" is "3" has been described; however, the task performance analysis unit 27 executes similar processing for other task IDs actually.

FIG. 12 illustrates a matching degree calculation result by the task performance analysis unit 27 constituting the maintenance management confirmation device 2 illustrated in FIG. 1. As illustrated in FIG. 12, the matching degree calculation result is output in a list (tabular format) consisting of, for example, "maintenance work log task ID", "diagnosis information source", "automatic diagnosis result log alarm ID", "matching degree M", and "issuing time".

As illustrated in FIG. 12, for the "maintenance work log task ID" of "1", "NA" is written in the "diagnosis information source" column, is written in the "automatic diagnosis result log alarm ID" column, "0.33" is written in the "matching degree M" column, and "2016/10/03 09:00" is written in the "issuing time" column.

In addition, for the "maintenance work log task ID" of "3", "NA" is written in the "diagnosis information source" column, "1" and "2" are written in the "automatic diagnosis result log alarm ID" column, "1" is written in the "matching degree M" column, and "2016/10/03 09:00" and "2016/10/03 11:00" are written in the "issuing time" column.

As described above, the maintenance management confirmation device 2 detects whether there is a possibility that the automatic diagnosis result by the automatic diagnosis unit 4 has been used for the maintenance work, by calculating the matching degree M between the automatic diagnosis result recorded in the automatic diagnosis result log storage unit 25 and the maintenance work log recorded in the maintenance work log storage unit 24, thereby being able to appropriately detect use of the automatic diagnosis result regardless of whether or not there is a description of presence or absence of the use of the automatic diagnosis result in the maintenance work log recorded in the maintenance work log storage unit 24 or the work instruction recorded in the work instruction log storage unit 26.

Note that, the method of calculating the matching degree M by the task performance analysis unit 27 is not limited to the method described above. For example, in the failure information database 21 (FIG. 3) linked to the automatic diagnosis result, the component, failure mode, symptom, and cause are stored. This can be compared with the inspection result (inspection content) recorded in the maintenance work log storage unit 24 (FIG. 8) by text matching. When there is a matching word, the matching degree M may be calculated as, for example, $M=1-2^{-n}$ depending on the number of matches n. In this case, in text matching, as the number of matches n is smaller, a value of the matching degree M is smaller than 1, and when the number of matches n is zero, the matching degree is M=0. Conversely, as the number of matches n is larger, the matching degree M approaches 1 limitlessly.

In addition, even when the identified failure IDs are different from each other, if actual treatment works are the same as each other, and the work times and effects of preventing loss expansion are the same as each other, it is considered that the matching degree M is high, and there is also a method that compares the maintenance method database 23 linked to the failure information database 21 linked to the automatic diagnosis result with the maintenance method (work content) actually recorded in the maintenance work log storage unit 24. In this case, if both maintenance method IDs match each other, the matching degree M may be set to M=1, or focusing on the fact that the identified failure IDs are different from each other, the matching degree M may be lowered, for example, to M=0.5.

Next, a method will be described of calculating a profit obtained by the maintenance company by use of the automatic diagnosis result by the automatic diagnosis unit 4 and determining a charge amount.

(Calculation of Charge Amount by Charge Processing Device)

A charge amount estimation unit 81 constituting the charge processing device 8 illustrated in FIG. 1 performs estimation of the profit obtained by the maintenance company by the maintenance work implementation, and estimation of the charge amount in which a part of the profit obtained by the maintenance company is set as a usage fee of the automatic diagnosis result, by using determination whether it is estimated that there is a possibility of use of the automatic diagnosis result by the automatic diagnosis unit 4 to the maintenance work and the result has been actually used, and by using the matching degree M at that time.

First, a method will be described of estimating the profit obtained by the maintenance company. In the present embodiment, the profit obtained by the maintenance work implementation and the use of the automatic diagnosis result by the automatic diagnosis unit 4 is calculated as prevention of destruction and deterioration expansion of the target asset 10 by early treatment, securing of opportunity profit by prevention of influence on operation, and reduction of work cost due to reduction of the inspection by the maintenance worker by the use of the automatic diagnosis result. Note that, about the securing of opportunity profit, even when the operation company and the maintenance company are different companies, the profit can be replaced with a penalty charged on the maintenance company when the operation company loses the opportunity profit.

In addition, securing safety by maintenance work implementation can also be converted into an amount, for example, by calculation through an insurance amount regarding an accident at the time of target failure occurrence. Alternatively, it is possible to use a penalty amount charged on the basis of a contract from the operation company to the maintenance company.

FIG. 13 illustrates a data structure of a diagnostic charge database 83 constituting the charge processing device 8 illustrated in FIG. 1. As illustrated in FIG. 13, the diagnostic charge database 83 stores "operation fault prevention effect [10,000 yen]" and "work cost reduction effect [10,000 yen]" in association with the "failure ID" stored in the failure information database 21 (FIG. 3). Here, for the operation fault prevention effect, a profit obtained when an operation fault due to a failure can be prevented is estimated from a loss received due to destruction, operation stop, insurance premium rise, and the like of the target asset 10 when the fault cannot be prevented. It is assumed that this estimation is calculated from past statistics and values described in the contract. In addition, the work cost reduction effect is a cost reduction effect corresponding to a work time reduction effect when the automatic diagnosis result by the automatic diagnosis unit 4 is used. In the present embodiment, the "operation fault prevention effect [10,000 yen]" and "work cost reduction effect [10,000 yen]" in the diagnostic charge database 83 are stored as constants; however, the effects may be set on the basis of a loss at the time of past failure occurrence, or cost conversion statistics of the work time of the diagnosis by the maintenance worker.

Figure 14:
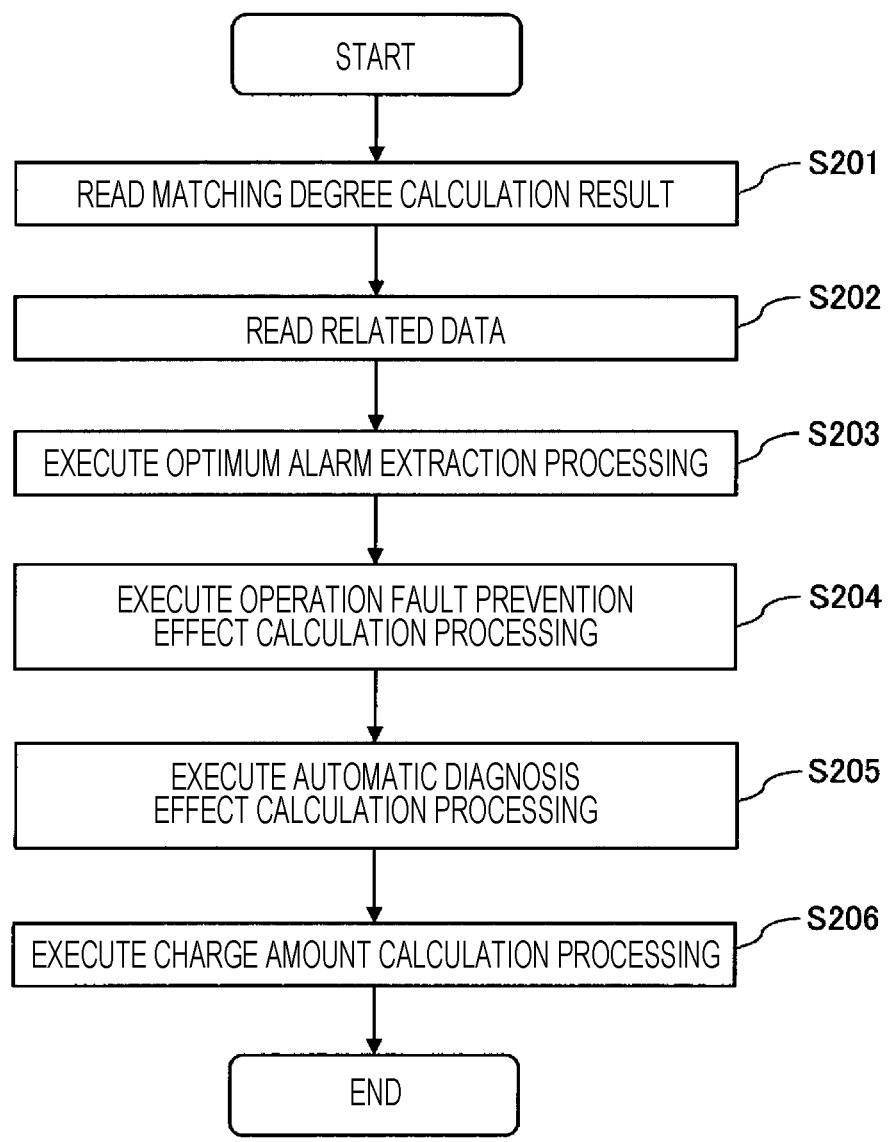
FIG. 14 is a processing flow diagram of a charge amount estimation unit constituting the charge processing device illustrated in FIG. 1.

FIG. 14 is a processing flow diagram of the charge amount estimation unit 81 constituting the charge processing device 8 illustrated in FIG. 1. When the maintenance work log is newly recorded in the maintenance work log storage unit 24 constituting the maintenance management confirmation device 2 described above, and the matching degree M is calculated by the task performance analysis unit 27, or at a certain time interval, the charge amount estimation unit 81 is activated on the basis of the instruction or the like of the maintenance company or the IT company. In the present embodiment, a case will be described where the maintenance work logs are processed one by one, as an example; however, a plurality of maintenance work logs may be collectively processed.

As illustrated in FIG. 14, in step S201, the charge amount estimation unit 81 executes processing of reading the matching degree calculation result. Specifically, the charge amount estimation unit 81 reads via the bus the matching degree calculation result (FIG. 12) calculated by the task performance analysis unit 27 constituting the maintenance management confirmation device 2.

In step S202, the charge amount estimation unit 81 executes processing of reading related data. Specifically, the charge amount estimation unit 81 accesses via the bus the failure information database 21, the maintenance method database 23, the maintenance work log storage unit 24, the automatic diagnosis result log storage unit 25, the work instruction log storage unit 26, and the maintenance plan database 5. Then, with the task ID and the alarm ID included in the matching degree calculation result (FIG. 12) read in step S201 as a search key, the charge amount estimation unit 81 reads the related data to be used in the subsequent work from the failure information database 21, the maintenance method database 23, the maintenance work log storage unit 24, the automatic diagnosis result log storage unit 25, the work instruction log storage unit 26, and the maintenance plan database 5.

In step S203, the charge amount estimation unit 81 executes optimum alarm extraction processing. Specifically, the charge amount estimation unit 81 determines whether there is a possibility that an alarm has been used for determination of a work instruction by the maintenance planner, and, to extract an alarm estimated to have been most useful, extracts an alarm with the highest matching degree M in alarms issued before the work instruction. When there are alarms with the same matching degree M, an alarm with the earliest issuing time is extracted as the optimum alarm. This is because an alarm having issued early can reduce a failure occurrence risk, facilitate maintenance preparation, and reduce influence on operation. In addition, in the case of charging with an emphasis on the alarm actually used, instead of the convenience of an arrangement between the maintenance company and the IT company, or the possibility that the alarm could be used, an alarm ID written to a diagnosis information source may be used in the optimum alarm extraction processing.

In step S204, the charge amount estimation unit 81 executes operation fault prevention effect calculation processing. Specifically, the charge amount estimation unit 81 calculates the operation failure prevention effect by using the data of the "operation fault prevention effect" column stored in the diagnostic charge database 83, or the like. In this processing, it is determined whether there was a possibility that the operation stop could be prevented by alarm issuing, and if it was possible, the effect is included, and if not possible, the effect is not included. That is, this is because, when a period is short from the alarm issuing to the next maintenance available timing and it is not possible to prepare for maintenance work implementation even if an alarm is issued, the maintenance available timing is missed, and as a result, there is a possibility that the operation will have to be stopped before the maintenance available timing. To make this determination, comparison is performed between a date obtained by adding to the alarm issuing time a lead time until implementation of the maintenance work stored in the "maintenance request" column of the automatic diagnosis definition database 22, and the maintenance available dates stored in the maintenance plan database 5. When a maintenance available date exists within the lead time from the alarm issuing time, it is estimated that the operation loss could be prevented, and a failure ID is extracted corresponding to the alarm ID. An amount stored in the "operation fault prevention effect" column corresponding to the failure ID extracted in the diagnostic charge database is set as an operation fault prevention amount PO. However, when there is no maintenance available date, the operation will be stopped until the next maintenance available date, so that the effect is not included, and the operation fault prevention amount is set to PO=0.

Note that, for a work cost reduction effect amount PM, if an alarm is issued before the work instruction, it is possible to estimate that maintenance work is possible by using the result, so that if it is the optimal alarm extracted in step S203, a failure ID is extracted corresponding to the alarm ID of the optimum alarm. Then, as the work cost reduction effect amount PM, an amount is set stored in the "work cost reduction effect" column corresponding to the failure ID extracted in the diagnostic charge database 83.

In step S205, the charge amount estimation unit 81 executes automatic diagnosis effect calculation processing. Specifically, the charge amount estimation unit 81 accesses via the bus the maintenance work log storage unit 24, and, when an actual failure ID revealed in the inspection can be identified by the automatic diagnosis result by the automatic diagnosis unit 4, calculates an amount PE of a profit that has been actually obtained or could have been obtained by use of the automatic diagnosis result, as PE=PO+PM. Further, on the basis of the failure ID actually specified by the automatic diagnosis result and the matching degree M of the failure ID recorded in the maintenance work log storage unit 24, a profit P that has been obtained or could have been obtained by the maintenance company is calculated as P=PE×M.

In step S206, to set a part of the profit P obtained by the maintenance company, which is calculated in step S205, as the charge amount of the maintenance IT company, the charge amount estimation unit 81 executes charge amount calculation processing. Specifically, the charge amount estimation unit 81 estimates the charge amount C as C=P×R, where R is a charge rate. Note that, the charge rate R is determined in advance by the arrangement between the maintenance company and the maintenance IT company, and is set to, for example, R=10%. In addition, different charge rates R may be set for each piece of failure information.

By the above processing, the charge amount estimation unit 81 can estimate the charge amount C for the profit that has been actually obtained or could have been obtained by the maintenance company by use of the automatic diagnosis result.

FIG. 15 is a diagram illustrating a charge amount estimation result by the charge amount estimation unit 81 constituting the charge processing device 8 illustrated in FIG. 1. As illustrated in FIG. 15, the charge amount estimation result is output in a list (tabular format) consisting of "task ID", "alarm ID", "matching degree M", "operation loss prevention amount PO", "operation loss prevention availability", "work cost reduction amount PM", "expected profit PE", "profit P", and "charge amount C [10,000 yen]".

In the example illustrated in FIG. 15, in the task ID "1", the task ID "3", and the task ID "4" recorded in the maintenance work log storage unit 24, the operation fault prevention effect is obtained, so that the "operation loss prevention amount PO" and the "work cost reduction amount PM" are obtained. However, in the task ID "2", the "profit P" and the "charge amount C [10,000 yen]" are both "0" since an alarm is not issued (alarm ID is "none"). In the task ID "5" and the task ID "6", although the alarm has been issued, the maintenance work could not be performed since it was immediately before the closest maintenance available date, and the maintenance work has been performed on the next maintenance available date. For that reason, the "operation loss prevention availability" is "unavailable" since the operation stop has occurred.

The charge amount estimation unit 81 outputs (transfers) the charge amount estimation result to the charge amount determination unit 82 via the bus. The charge amount determination unit 82 displays the charge amount estimated by the charge amount estimation unit 81 on the screen of the display device (not illustrated) constituting the HMI 9, and determines the charge amount by taking confirmation by the maintenance company. At this time, to make it possible to determine validity of the charge by the maintenance company in detail, contents of the alarm, the maintenance work instruction, and the maintenance work may be simultaneously displayed on the screen as auxiliary information.

In addition, since it is conceivable that the maintenance company and the maintenance IT company take an agreement on the validity of the charge, an individual confirmation completion button, check box, and the like may also be displayed on the screen so that confirmation can be easily taken for each maintenance work log recorded in the maintenance work log storage unit 24. In addition, an input area where the charge amount C can be corrected and input may be provided on the screen. As a result, it becomes possible for the maintenance company to make a complaint for an alarm that has no effect at all in practice although the maintenance company has obtained an effect in terms of calculation and the charge amount C is other than 0.

For example, regarding the task ID "6" in the maintenance work log storage unit 24 (FIG. 8), although the alarm is issued at the issuing time "2016/10/03 12:01" as indicated for the alarm ID "6" in the automatic diagnosis result log storage unit 25, since it was immediately before the operation is impossible, measures such as stopping the vehicle could not be made in time, so that the carriage 1 was broken and the maintenance company suffered a great deal of loss. This is considered to have been prevented, for example, if the bearing heat detection of the automatic diagnosis ID "6" stored in the automatic diagnosis definition database 22 finds a sign of abnormality earlier and stops the vehicle safely. Alternatively, deterioration of the bearing generally expands from generation of vibration due to a small damage or the like to heat generation due to a large damage, and then the heat generation leads to a major failure such as fixation in a short period of time. For that reason, although detection of the bearing abnormal vibration of the automatic diagnosis ID "1" should have been issued first, it has not been issued this time. As described above, when it is considered that the alarm has not been appropriately issued or scheduled performance is not satisfied, the maintenance company does not approve the charge, thereby being able to avoid unfair charging and notify the maintenance IT company of a problem of the automatic diagnosis unit 4. Alternatively, it is also conceivable to reduce the charge amount C.

On the other hand, conversely, even if the charge amount is estimated to be zero, for example, when it is due to a defect in the sensor 11, it is not a responsibility of the maintenance IT company, so that it is also conceivable to charge a certain amount of money as it was originally detectable.

FIG. 16 illustrates a screen display example of the display device constituting the HMI 9 illustrated in FIG. 1. As illustrated in FIG. 16, a display screen 91 of the display device constituting the HMI 9 is constituted by a first display area 92 and a confirmation button 93. The first display area 92 displays: an area in which the "task ID", "inspection result", and "failure ID" extracted from the maintenance work log storage unit 24 are displayed; an area in which the "alarm ID" extracted from the automatic diagnosis result log storage unit 25, the "diagnosis type" extracted from the automatic diagnosis definition database 22, and the "matching degree" calculated by the task performance analysis unit 27 are displayed; an area in which the "maintenance company profit estimate [10,000 yen]" and "charge amount [10,000 yen]" output from the charge amount estimation unit 81 are displayed together; an area of the "charge amount determined value [10,000 yen]" that enables entry of the charge amount finally determined on the basis of the discussions between the maintenance company and the maintenance IT company; and a check box for determining "agreement" of the maintenance company and the maintenance IT company by clicking, for example, with a mouse. Note that, contents displayed in the first display area 92 is not limited to display contents described above, and the display contents may be changed as appropriate. In addition, a configuration may be adopted in which each area described above, for example, the "task ID" area or the "failure ID" area is activated by clicking with the mouse so that the associated individual data, the work instruction log, the maintenance work log, or the automatic diagnosis result log is displayed in a pop-up window or link screen.

When checkmarks are input to all items of the check box indicating "agreement", or when checkmarks are input to some items, if the mouse cursor is moved onto the confirmation button 93, and the confirmation button 93 is activated by clicking with the mouse, the charge amount of the corresponding item is determined. As a result, the maintenance company is notified of the charge amount.

On the other hand, the maintenance IT company is notified of a charge amount for each automatic diagnosis result, an alarm issuing status, or a negotiation result with the maintenance company, a charge status for each maintenance work log, in addition to the charge amount.

As a result, the maintenance IT company knows information such as a maintenance work log in which an alarm cannot be appropriately issued and charging cannot be performed, and an alarm with a low charge amount, or failure information linked to them, thereby having an incentive to add diagnostic criteria in the automatic diagnosis definition database 22, or implement preventive alarm issuing by improvement of diagnostic criteria, and further to improve the matching degree M by the improvement of the diagnostic criteria. In addition, for the automatic diagnosis result by the automatic diagnosis unit 4 with a high charge amount, that is, with a large improvement effect on maintenance business for the maintenance company, it becomes possible to plan to increase resources used for diagnosis in the automatic diagnosis unit 4.

In particular, as in the present embodiment, the profit P of the maintenance company is calculated by multiplication of the matching degree M, whereby automatic diagnosis is performed with high identification accuracy of the failure mode, so that it is possible to increase the maintenance company profit and the charge amount. For example, in the case of the door open abnormality of task ID "1" illustrated in FIG. 16, the alarm (alarm ID "3") is issued of the door opening time abnormality of the automatic diagnosis ID "4", and as a result, the matching degree is M=0.33. However, if the alarm was issued of the door rail resistance increase of the automatic diagnosis ID "5" stored in the automatic diagnosis definition database 22, the matching degree was M=1, and the maintenance company could further reduce the inspection, and maintenance IT company could also gain larger charge amount. This is because, the diagnostic criteria of the door rail resistance increase was not satisfied; however, if diagnosis was performed with higher accuracy by improvement of the diagnostic criteria, or installation of a new sensor, there is a possibility that the alarm could be issued of the door rail resistance increase.

Note that, in the present embodiment, the charge processing device 8 is provided in the maintenance management system 1; however, the present invention is not necessarily limited to this. For example, the charge processing device 8 may be connected to the maintenance management system 1 via a network (whether wired or wireless).

As described above, according to the present embodiment, it becomes possible to provide the maintenance management system enabled to appropriately detect use of the automatic diagnosis result by the maintenance company, and the maintenance management confirmation device used for the maintenance management system. In addition, according to the present embodiment, the maintenance IT company is enabled to perform appropriate charging for the profit obtained by the maintenance company by maintenance work based on the automatic diagnosis result.

Note that, the present invention is not limited to the embodiment described above, and includes various modifications.

For example, the embodiment described above has been described in detail for describing the present invention clearly, and is not necessarily limited to that including all the configurations described.

REFERENCE SIGNS LIST

1 Maintenance management system
2 Maintenance management confirmation device
3 Measurement value database
4 Automatic diagnosis unit
5 Maintenance plan database
6 Task planning unit
7 Task implementation recording unit
8 Charge processing device
9 HMI
10 Target asset
11 Sensor
21 Failure information database
22 Automatic diagnosis definition database
23 Maintenance method database
24 Maintenance work log storage unit
25 Automatic diagnosis result log storage unit
26 Work instruction log storage unit
27 Task performance analysis unit
81 Charge amount estimation unit
82 Charge amount determination unit
83 Diagnostic charge database
91 Display screen
92 First display area
93 Confirmation button

The invention claimed is:

1. A maintenance management system comprising:
a failure information database that stores at least a failure mode for each of a plurality of diagnosis target assets;
an automatic diagnosis definition database that stores diagnostic criteria for diagnosing failure modes of the diagnosis target assets;
an automatic diagnosis unit that detects or predicts respective occurrences of failure modes of each of the diagnosis target assets, based on a measurement value representing a state of each of the diagnosis target assets measured by a sensor and the diagnostic criteria;
a maintenance method database that stores a plurality of predetermined maintenance methods corresponding to respective a-failure modes;
an automatic diagnosis result log storage unit that records at least a diagnosis result by the automatic diagnosis unit and information indicating a time of an alarm issued;
a maintenance work log storage unit that records at least content indicating maintenance work performed on each of the diagnosis target assets;
a task performance analysis unit calculates a matching degree based on information in maintenance work content recorded in the maintenance work log storage unit with information in the maintenance method corresponding to a respective failure mode of a respective diagnosis result by the automatic diagnosis unit and stored in the maintenance method database, and automatically detects whether an automatic diagnosis result is used for maintenance work based on the calculated matching degree,
wherein the maintenance management system further comprises a charge processing device that calculates a charge amount based on at least the matching degree calculated by the task performance analysis unit; and
a charge amount determination unit that displays on a screen of a display device the charge amount estimated by the charge amount estimation unit, and determines the charge amount for use of the diagnosis result by the automatic diagnosis unit, based on a correction input for the charge amount estimated displayed on the screen.

2. The maintenance management system according to claim 1, wherein
the failure information database stores a network representing a hierarchical relationship between a plurality of components constituting each of the diagnosis target assets, and
the task performance analysis unit calculates the matching degree by using a component corresponding to a maintenance work content recorded in the maintenance work log storage unit, and a decreasing function based on a distance on a network to a component corresponding to a maintenance method corresponding to a failure mode of a diagnosis result by the automatic diagnosis unit and stored in the maintenance method database.

3. The maintenance management system according to claim 2, wherein
the charge amount estimation unit estimates a charge amount for use of a diagnosis result by the automatic diagnosis unit, based on the matching degree calculated by the task performance analysis unit, the information regarding the alarm issued recorded in the automatic diagnosis result log storage unit, and a profit obtained by use of the diagnosis result for maintenance work.

4. The maintenance management system according to claim 1, wherein
the charge amount estimation unit estimates a charge amount for use of a diagnosis result by the automatic diagnosis unit, based on the matching degree calculated by the task performance analysis unit, the information regarding the alarm issued recorded in the automatic diagnosis result log storage unit, and a profit obtained by use of the diagnosis result for maintenance work.

* * * * *